US009841000B2

(12) United States Patent
Greenblatt

(10) Patent No.: US 9,841,000 B2
(45) Date of Patent: Dec. 12, 2017

(54) ENERGY CONVERSION FROM FLUID FLOW

(75) Inventor: David Greenblatt, Haifa (IL)

(73) Assignee: TECHNION RESEARCH AND DEVELOPMENT FOUNDATION LTD., Haifa (IL)

(*) Notice: Subject to any disclaimer, the term of this patent is extended or adjusted under 35 U.S.C. 154(b) by 473 days.

(21) Appl. No.: 13/885,843

(22) PCT Filed: Nov. 16, 2011

(86) PCT No.: PCT/IL2011/050011
§ 371 (c)(1),
(2), (4) Date: May 16, 2013

(87) PCT Pub. No.: WO2012/066550
PCT Pub. Date: May 24, 2012

(65) Prior Publication Data
US 2013/0227940 A1 Sep. 5, 2013

Related U.S. Application Data

(60) Provisional application No. 61/414,242, filed on Nov. 16, 2010.

(51) Int. Cl.
F03B 17/06 (2006.01)
F03B 5/00 (2006.01)
F03D 5/00 (2006.01)

(52) U.S. Cl.
CPC ........... F03B 17/06 (2013.01); F03B 5/00 (2013.01); F03D 5/00 (2013.01); F05B 2250/41 (2013.01);
(Continued)

(58) Field of Classification Search
CPC ... F03D 5/06; F03D 5/10; F03D 9/008; F03B 17/061; F15B 1/024; F15B 60/398
See application file for complete search history.

(56) References Cited

U.S. PATENT DOCUMENTS 4,852,350 A * 8/1989 Krisko ............... 60/325
6,273,680 B1 8/2001 Arnold
(Continued)

FOREIGN PATENT DOCUMENTS

GB 2002456 A 2/1979

OTHER PUBLICATIONS

McLaughlin, T., Munska, M., Vaeth, J., Dauwalter, T., Goode, J., Siegel, S. Plasma-Based Actuators for Cylinder Wake Vortex Control. 2nd AIAA Flow Control Conference [online], Jun. 2004 [retrieved on Jul. 31, 2015]. Retrieved from the Internet:< URL: http://arc.aiaa.org/doi/pdf/10.2514/6.2004-2129>.*
(Continued)

Primary Examiner — Thomas E Lazo
Assistant Examiner — Matthew Wiblin
(74) Attorney, Agent, or Firm — Browdy and Neimark, P.L.L.C.

(57) ABSTRACT

A device for use in extracting energy from an incoming fluid flow is presented. The device comprises: an oscillator assembly mounted on a base, the oscillator assembly comprising: a main body for exposing to an incoming fluid flow; and a joining element attached to the main body and configured for anchoring the main body to the base and enabling oscillation of the main body with respect to the base; an operative flow affecting unit comprising at least one flow interacting element located in at least one location respectively on a surface of the main body, the operative flow affecting unit being configured and controllably operable for affecting a separation of streams of the fluid flowing over the surface of the main body; a control unit in communication with the operative flow affecting unit, the control unit being configured and operable for activating and deactivating of each of the at least one flow interacting element of the operative flow affecting unit according to a certain
(Continued)

time pattern, the time pattern being selected such that interaction between the flow interacting element and fluid streams creates vortices in the fluid streams at a selected vortex formation frequency causing an increase in oscillation of the main body, thereby enabling conversion of motion from the oscillation into useful energy.

27 Claims, 17 Drawing Sheets

(52) U.S. Cl.
CPC .............. *Y02E 10/20* (2013.01); *Y02E 10/28* (2013.01); *Y02E 10/70* (2013.01)

(56) References Cited

U.S. PATENT DOCUMENTS

| | | | |
|---|---|---|---|
| 6,283,406 B1 * | 9/2001 | Remington | B64C 23/06 244/1 N |
| 6,963,479 B2 * | 11/2005 | Krichtafovitch | 361/226 |
| 6,964,168 B1 * | 11/2005 | Pierson et al. | 60/670 |
| 7,493,759 B2 † | 2/2009 | Bernitsas | |
| 8,047,232 B2 † | 11/2011 | Bernitsas | |
| 2006/0006290 A1 * | 1/2006 | Loth | B64C 11/001 244/199.2 |
| 2007/0215747 A1 * | 9/2007 | Siegel | 244/9 |
| 2008/0048455 A1 * | 2/2008 | Carney | 290/54 |
| 2008/0295509 A1 * | 12/2008 | Bernitsas et al. | 60/497 |
| 2009/0114002 A1 * | 5/2009 | Bernitsas et al. | 73/105 |
| 2009/0250129 A1 | 10/2009 | Bernitsas et al. | |

OTHER PUBLICATIONS

Williamson, C.H.K. and Govardhan, R., Dynamics and Forcing of a Tethered Sphere in a Fluid Flow, Journal of Fluids and Structures ,1997, pp. 293-305, vol. 11, Academic Press Limited.

Greenblatt, D., Melton, L, Yao, C., Harris, J., Active Control of a Wing Tip Vortex, AIAA Paper 2005-4851, 2005, pp. 1-14, 23rd AIAA Applied Aerodynamics Conference, Westin Harbour Castle, Toronto, Ontario.

Greenblatt, D., Management of Vortices Tailing Flapped Wings via Separation Control, AIAA Paper 2005-0061, 2005, pp. 1-22, 43rd AIAA Aerospace Sciences Meeting and Exhibit, Reno, Nevada.

Greenblatt, D., Neuburger, D., Wygnanski, I., Dynamic Stall Control by Intermittent Periodic Excitation, AIAA Journal of Aircraft, 2001, pp. 188-190, vol. 38, No. 1, American Institute of Aeronautics and Astronautics Inc.

Michael M. Bernitsas et. al, VIVACE Vortex Induced Vibration Aquatic Clean Energy: A New Concept in Generation of Clean and Renewable Energy From Fluid Flow, Journal of Offshore Mechanics and Arctic Engineering, Nov. 2008, pp. 1-15, vol. 130, ASME.

Greenblatt, D. and Wygnanski, I., The control of separation by periodic excitation, Progress in Aerospace Sciences, 2000, pp. 487-545, vol. 36, No. 7, Elsevier Science Ltd.

Jauvtis, N., Govardhan, R., and Williamson, C.H.K., Multiple Modes of Vortex-Induced Vibration of a Sphere, Journal of Fluids and Structures, 2001, pp. 555-563, vol. 15, Academic Press.

Naim; Greenblatt; Seifert; Wygnanski, Active Control of a Circular Cylinder Flow at Transitional Reynolds Numbers, Flow Turbulence Combust, 2007, pp. 383-407, vol. 78, Springer.

\* cited by examiner
† cited by third party

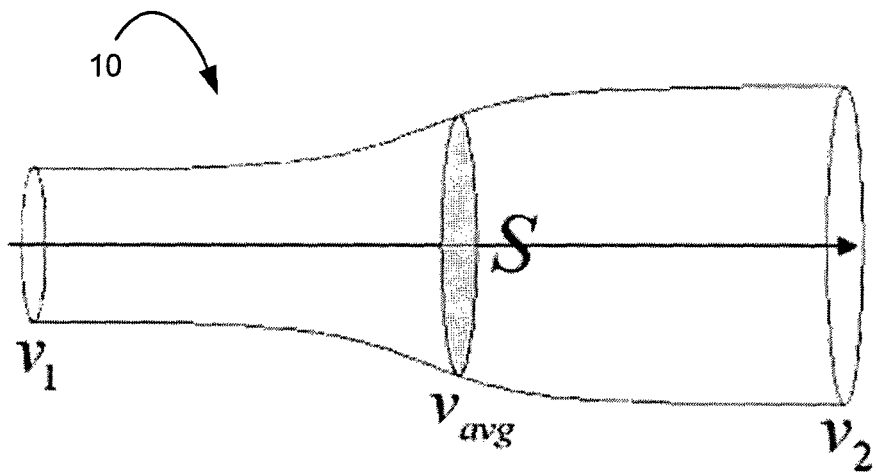
Fig. 1a (general art)
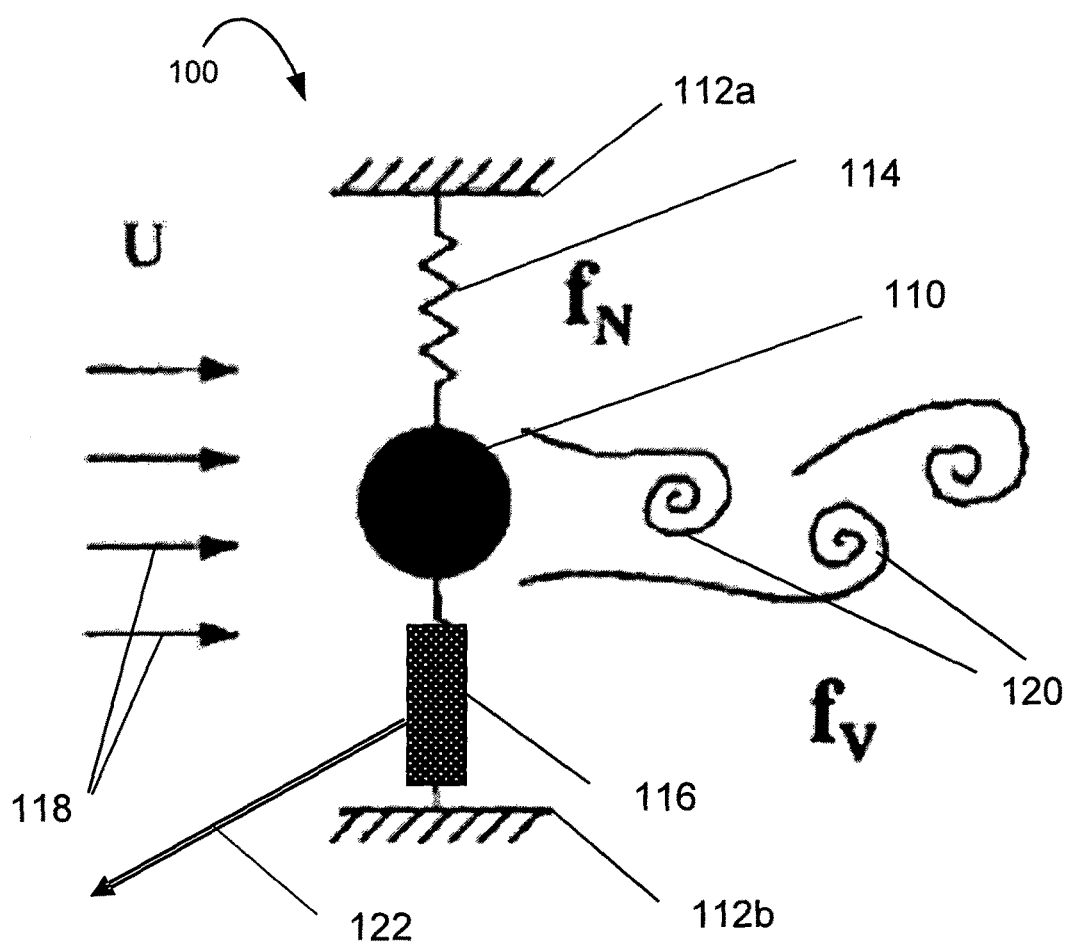
Fig. 1b (general art)

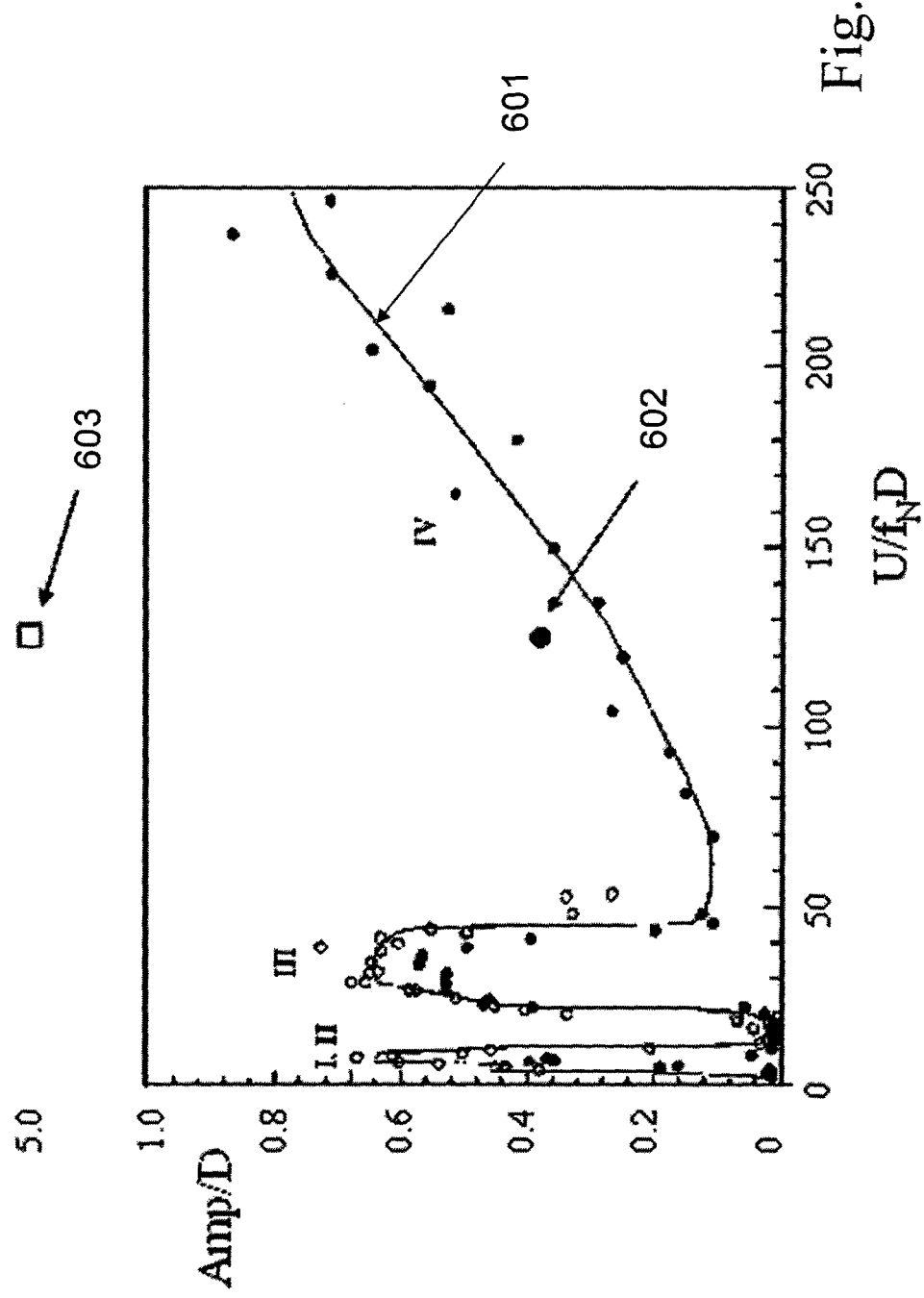

ENERGY CONVERSION FROM FLUID FLOW

FIELD OF THE INVENTION

The present invention relates to a technique for generating useful energy from a flowing fluid, and more specifically to the use of vortex shedding to increase an oscillation of an oscillating device and converting the oscillation into energy.

BACKGROUND OF THE INVENTION

Ocean energy in the form of waves, currents, tides, and thermal and salinity gradients can provide an abundant supply of clean and renewable energy. Similarly, wind power may provide renewable energy. However, constructing of safe, efficient, affordable and durable system for converting fluid flow to usable energy remains challenging.

When a fluid flow encounters a front surface of an object, vortices are formed behind the object. This phenomenon is called vortex shedding. The vortices are formed at a vortex formation frequency affected by such variables as the geometry of the object, the speed of the fluid flow, and the properties of the fluid. The vortex formation frequency is known to affect the motion of the object.

According to earlier approaches, vortex shedding phenomena were typically minimized in order to decrease noise and damage to the energy conversion systems. More recent developments, however, have indicated that vortex shedding may be used for increasing energy generation from a fluid flow. For example, U.S. Pat. No. 7,208,845 discloses an electrical power generating system including a vibrating assembly which as a vortex shedding device that sheds vortices in response to fluid flow across vibrating assembly, and generator that generates electrical power in response to vibration of the vibrating assembly. The vortex shedding device sheds the vortices at a frequency which is substantially equal to a resonant frequency of the vibrating assembly.

In a paper titled "VIVACE Vortex Induced Vibration Aquatic Clean Energy: A New Concept in Generation of Clean and Renewable Energy From Fluid Flow"; to Michael M. Bernitsas et. al. (published in Journal of Offshore Mechanics and Arctic Engineering NOVEMBER 2008, Vol. 130/041101-1), the authors discloses a vortex induced vibration aquatic clean energy (VIVACE) which converts ocean/river current hydrokinetic energy to a usable form of energy such as electricity using vortex-induced vibration (VIV) successfully and efficiently. VIVACE is based on the idea of maximizing rather than spoiling vortex shedding, and exploiting rather than suppressing VIV. It introduces optimal damping for energy conversion while maintaining VIV over a broad range of vortex shedding synchronization. VIV occurs over very broad ranges of Reynolds (Re) number.

Patent publications to M. Bernitsas et. al include US 2009/0250129 disclosing fluid motion energy converter for e.g. power plants having power device for converting motion of movable element into usable energy wherein roughness is added to the surface of a bluff body in a relative motion with respect to a fluid. US 2009/0114002 discloses a system for reducing vortex induced forces on bluff structure arranged in fluid, has bluff structure with several rough zones formed on surface in staggered orientation, of specific height with respect to linear dimension. US 2009/discloses a vortex induced force enhancing system for harnessing of clean and renewable energy, having roughness zone defining roughness height extending above surface of zone that is less than or equal to specific percentage of linear body dimension. U.S. Pat. No. 7,493,759 and US Patent Publication 2008/0295509 disclose a fluid motion energy converter having a power device for converting vortex induced motion of a movable element into usable energy.

General Description

The techniques disclosed in the above-described art are based, in part, on vortex induced vibration (VIV), also called "lock-on" or "synchronization". A "lock-on" or "synchronization" occurs when an oscillator's oscillation frequency (f) and vortex formation frequency ($f_V$) are close to the natural frequency ($f_N$) of the body within a regime of large-amplitude vibration. When lock-on occurs, the amplitude of the oscillation increases, enabling an increased yield of usable energy from the conversion of motion into energy.

In the above-described art, in order to attain lock-on, vortex shedding is affected in a so-called passive fashion. This is achieved, for example, by shaping the object (or part of the object) facing the fluid flow in a manner that causes the vortex formation frequency to reach a desired value. As will be described below, in the detailed description, the inventor has found that passively affecting vortex shedding has some limitations. Namely, lock-on is a natural phenomenon that requires certain flow conditions, (e.g. a flow velocity and/or Reynolds number need to be within specific ranges) in order to occur. The use of such techniques is therefore advantageous only when the fluid flow satisfies such conditions. If such conditions are not satisfied, passively affecting vortex shedding does not cause the occurrence of lock on.

There is a need for a technique which forces the occurrence of a so-called "artificial lock on" for a variety of flow conditions, not necessarily those satisfying the natural lock on conditions. In other words, there is a need for technique for achieving the lock on effect while being independent or at least weakly dependent (flexible) on the fluid flow conditions such as for example a flow velocity and/or Reynolds number.

The present invention solves the above problem by providing a technique for actively controlling flow conditions over a surface of an oscillator in a predetermined manner, in order to affect vortex shedding over an oscillator and thereby increase oscillation amplitude of the oscillator. According to some aspects of the present invention, the active control is performed by affecting promoting time-dependent flow separation over the oscillator's surface. Alternatively or additionally, the active control may utilize time-dependent promotion of flow attachment to the oscillator's surface (i.e. reduction of flow separation over the oscillator's surface).

Therefore, an aspect of some embodiments of the present invention relates to a device for use in extracting energy from an incoming fluid flow. The device includes an oscillator assembly, and operative flow affecting unit, and a control unit. The oscillator assembly is mounted on a base, and includes a main body for exposing to an incoming fluid flow, and a joining element attached to the main body and configured for anchoring the main body to the base and enabling oscillation of the main body with respect to the base. The operative flow affecting unit includes at least one flow interacting element located in at least one location respectively on a surface of the main body, the operative flow affecting unit being configured and controllably operable for affecting a separation of streams of the fluid flowing over the surface of the main body. The control unit is in communication with the operative flow affecting unit, and is configured and operable for activating and deactivating of each of the at least one flow interacting element of the operative flow affecting unit according to a certain time pattern, the time pattern being selected such that interaction between the flow interacting element and fluid streams creates vortices in the fluid streams at a selected vortex formation frequency causing an increase in oscillation of the main body, thereby enabling conversion of motion from the oscillation into useful energy.

In a variant, the operative flow affecting unit is configured such that the at least one flow interacting element is operable for increasing separation between the main body's surface and the streams of fluid flowing over the main body's surface. Additionally or alternatively, the operative flow affecting unit is configured such that the at least one flow interacting element is operable for increasing attachment between the main body's surface and the streams of fluid flowing over the main body's surface.

In a further variant, the joining element is a spring. In yet a further variant, the joining element is a stalk joined to a pivot in the base, the stalk being rotatable at least in one plane with respect to the base, such that the oscillator assembly is a pendulum capable of oscillating about said pivot.

Optionally, the control unit is configured and operable to provide the vortex formation frequency approaching a natural frequency of the oscillator.

In a variant, the certain time pattern according to which the flow interacting element of the operative flow affecting unit is activated and deactivated is predetermined. In another variant the certain time pattern according to which the flow interacting element of the operative flow affecting unit is activated and deactivated is determined during the device's operation.

Optionally, the above device includes at least one sensor for sensing one or more parameters and generating measured data indicative thereof, the one or more parameters comprising at least one of the following: at least one parameter relating to said motion of the main body, at least one parameter relating to the fluid flow, at least one property of the fluid; and a processing utility configured and operable for receiving and processing the measured data from the at least one sensor and determining the time pattern data according to which the at least one flow interacting element of the operative flow affecting unit is activated and deactivated. The parameter relating to said motion may include at least one of an acceleration and a velocity of said main body. The parameter relating to the fluid flow may include at least a fluid flow velocity. The fluid property parameter may include at least one of fluid density and temperature.

Optionally, the oscillator assembly is configured as at least one of the following forms: a spring-based oscillator, a pendulum, an inverted pendulum.

In a variant, the operative flow affecting unit comprises at least one actuator for manipulating the at least one flow interacting element. In another variant, the flow interacting element has one of the following configurations: a retractable flap, a retractable protrusion, a slot. In yet another variant, at least part of the surface of the main body is electrically conductive, and wherein the operative flow affecting unit comprises an electrode insulated from the main body's surface, and the actuator is configured for applying a voltage between the main body's surface and the actuator, thereby creating and accelerating plasma along the surface of the main body and affecting the separation of streams of the fluid flowing over the surface of the main body.

Another aspect of some embodiments of the present invention relates to a method for use in extracting energy from an incoming fluid flow, the method comprising: providing an oscillator assembly mounted on a base, the oscillator assembly comprising: a main body for exposing to an incoming fluid flow; and a joining element attached to the main body and configured for anchoring the main body to the base and enabling oscillation of the main body with respect to said base; subjecting the oscillator to a fluid flow; controlling a separation of the fluid flowing along a surface of the main body by activating and deactivating at least one flow interactive element located on the surface of the main body according to a certain time pattern, the time pattern being selected such that interaction between the flow interacting element and fluid streams creates vortices in the fluid streams at a selected vortex formation frequency causing an increase in oscillation of the main body, thereby enabling conversion of motion from the oscillation into useful energy.

The method may further include converting the motion of the oscillation into useful energy.

Optionally, controlling a separation of the fluid flowing along a surface of the main body comprises increasing the separation between the main body's surface and the streams of fluid flowing over the main body's surface. Additionally or alternatively, controlling a separation of the fluid flowing along a surface of the main body comprises increasing attachment between the main body's surface and the streams of fluid flowing over the main body's surface.

In a variant, controlling a separation of the fluid flowing along a surface of the main body comprises providing the vortex formation frequency approaching a natural frequency of the oscillator.

In another variant, the certain time pattern according to which the flow interacting element of the operative flow affecting unit is activated and deactivated is predetermined. In yet another variant, the certain time pattern according to which the flow interacting element of the operative flow affecting unit is activated and deactivated is determined during the device's operation.

The oscillator assembly may be configured as at least one of the following forms: a spring-based oscillator, a pendulum, an inverted pendulum.

A further aspect of some embodiments of the present invention relates to a system for extracting energy for a fluid flow, comprising: at least one oscillating device configured as the device defined above; at least one compressor, each compressor being powered by the oscillating device and being configured for compressing a working fluid; an accumulation pipe for receiving the compressed working fluid from the at least one compressor and leading the compressed working fluid to a predetermined location, thereby enabling direct use or storage of the compressed working fluid for further use.

Optionally, the system further includes a motor configured for drawing the compressed working fluid located in said predetermined location and using the compressed working fluid to generate useful energy, and venting the working fluid after use.

In a variant, the working fluid is air, and the compressor comprises an air intake for drawing the air.

In a variant, the system further includes a hydraulic return pipe for returning the used working fluid to the at least one compressor.

BRIEF DESCRIPTION OF THE DRAWINGS

In order to understand the invention and to see how it may be carried out in practice, embodiments will now be described, by way of non-limiting example only, with reference to the accompanying drawings, in which:

FIGS. 1a-1b are schematic drawings illustrating a mode of operation of vortex-induced vibration as known in the art;

FIG. 18 is a graph illustrating experimental results providing an illustration of the effect of active flow control on a tethered sphere.

DETAILED DESCRIPTION OF EMBODIMENTS

Figure 2:
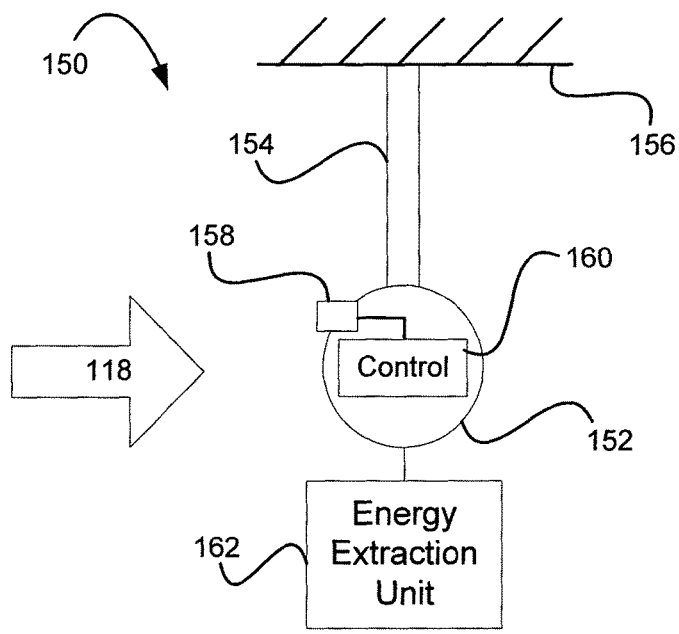
FIG. 2 is a schematic drawing illustrating a device for extracting energy from an incoming fluid flow, according to some embodiments of the present invention.

Before describing the embodiments and examples of the present invention, a theoretical analysis of vortex-induced vibrations is in place. Using the laws of conservation of mass, momentum and energy for a control volume, combined with Bernoulli's law within the control volume for a conventional horizontal axis wind turbine, the maximum possible power generation can be derived. To this end, reference is now made to the figures, FIGS. 1a-1b, which illustrate a mode of operation of vortex-induced vibration as known in the art. FIG. 1a depicts the control volume analysis. FIG. 1b illustrates a general device 100 for power generation by uncontrolled or passively controlled VIV as known in the art.

In FIG. 1a, a control volume 10 of a fluid is shown which is characterized by the upstream flow speed $v_1$, the flow velocity $v_2$ in the wake of a turbine, and the area S of the turbine disk. It can easily be shown that the so-called induced velocity at the disk is $v_{avg}=(v_1+v_2)/2$. The maximum power that can be produced by a turbine ($P_{turb,\,max}$) divided by the power in the wind within the disk area is the maximum power coefficient $C_{P,\,max}$, which is known in the art as the "Betz limit":

$$C_{P,max} = \frac{P_{turb,max}}{1/2\rho U_\infty^3 S} = \frac{16}{27} = 59.3\% \qquad (1)$$

where $\rho$ is the fluid's density, and $U_\infty$ corresponds to the velocity $v_1$ of the incoming fluid flow.

In practice, this efficiency is not achieved, mainly due to rotor losses. Manufacturers claim that modern turbines achieve $C_{P,\,max}$ in the approximate range of 0.4 to 0.5, which is around 70% to 80% of the theoretical maximum shown in eqn. 1.

In FIG. 1b, the basic device 100 for power generation by VIV is shown which consists of a cylinder 110 of mass m, diameter D and a certain length L (into the page). It is attached to supports 112a and 112b via a spring 114 (shown on top) of stiffness k and a load 116 (here represented by the damper) with constant damping coefficient c.

An incoming fluid flow 118 with velocity $U_\infty$ arrives from a certain direction (from the left), interacts with cylinder 110 creating vortices 120 in the cylinder's wake, which cause the cylinder 110 to oscillate. Motion of cylinder 110 is converted to useful energy 122 in load 116.

The well-known linear equation of motion governing the oscillations is:

$$m\frac{d^2y}{dt^2} + c\frac{dy}{dt} + ky = F(t) \qquad (2)$$

where F(t) is the transverse force imposed on the cylinder as a result of vortex shedding, assumed here to be:

$$F(t) = 1/2 \rho U_\infty^2 DLC_l \sin(\omega_v t). \qquad (3)$$

$\rho$ is the air density, $\omega_v$ is the vortex shedding frequency $2\pi f_v$ and $C_l$ is the peak lift coefficient.

The shedding can be natural or forced. The solution to equation (2) subject to the forcing described in equation (3) is well known:

$$\frac{y}{D} = \frac{1/2 \rho U_\infty^2 DLC_l \sin(\omega_v t + \phi)}{k\sqrt{[1-(\omega_v/\omega_n)^2]^2 + (2\zeta \omega_v/\omega_n)^2}} \qquad (4)$$

where $$\phi(\omega_v) = -\tan^{-1}\left[\frac{2\zeta\omega_v/\omega_n}{1-(\omega_v/\omega_n)^2}\right]. \quad (5)$$

Here, $\omega_n = \sqrt{k/m}$ is the natural frequency of the device and $\zeta = c/2\sqrt{mk}$ damping ratio.

The peak amplitude $y_{max}$ is achieved at resonance, namely when $\omega_v = \omega_n$ and is:

$$y_{max} = \frac{1/2\rho U_\infty^2 D^2 L C_l}{k2\zeta} \quad (6)$$

The power imparted to the device over one cycle by the wind is:

$$P = \frac{1}{T}\int_0^T F(t)\left(\frac{dy}{dt}\right)dt \quad (7)$$

where T is the vortex shedding cycle time $2\pi/\omega_v$. Differentiating equation (4) and substituting it and equation (3) into equation (7) gives:

$$P = \frac{\omega_v D(1/2\rho U_\infty^2 DLC_l)^2}{k\sqrt{[1-(\omega_v/\omega_n)^2]^2 + (2\zeta\omega_v/\omega_n)^2}} \int_0^T \cos(\omega_v t + \phi)\sin(\omega_v t)dt \quad (8)$$

This equation can be integrated, and at resonance, the (maximum) power produced is:

$$P = \frac{\omega_v D(1/2\rho U_\infty^2 DLC_l)^2}{4k\zeta} \quad (9)$$

Hence the (ideal) maximum rower coefficient is:

$$C_{P,max} = \frac{\omega_v D(1/2\rho U_\infty^2 DLC_l)^2}{4k\zeta} \frac{1}{1/2\rho U_\infty^3 S} \quad (10)$$

where S is the area traversed by the cylinder, namely $L2y_{max}$. Substituting from equation (6) for $y_{max}$, yields:

$$C_{P,max} = \frac{1}{4}\frac{\omega_v D}{U_\infty}C_l = \frac{\pi}{2}StC_l \quad (11)$$

where St is the Stouhal number $f_vD/U_\infty$. This result can now be compared with equation (1).

Under conditions of natural or passive vortex shedding occurrence, the Stouhal number is St~0.21. Furthermore, there is a large variation in reported lift coefficient; at Reynolds numbers Re>200,000 most data indicate that $C_l$<0.4. This gives $C_p$~0.15 which does not compare favorably with 0.593 of equation (1). It should also be noted that when the amplitude of oscillation exceeds ½D, the cylinder begins to "outrun" the vortex shedding and $C_l$ drops even more. This occurs because, as the oscillation amplitude increases, so does the velocity of the oscillator. When the oscillation exceeds ½D, then the velocity of oscillating body is larger than the velocity at which vortices are shed, and therefore the effect that the vortices have on the oscillation is decreased. This puts a cap on the maximum power that can be generated by a particular setup.

The inventor has found that by employing appropriate active flow control, i.e. by actively affecting the flow over the cylinder according to a predetermined (typically time-varying) pattern, a condition that $C_l$>1 can be easily achieved (as can be seen, for example, on page 398 of the paper Naim, Greenblatt, Seifert, Wygnanski, "Active Control of a Circular Cylinder Flow at Transitional Reynolds Numbers", Flow Turbulence Combust (2007) 78:383-407); hence $C_P$>0.3 is also easily achievable. Moreover, the vortex shedding can also be controllably forced to reach higher frequencies than the natural vortex shedding St~0.21, further raising the achievable $C_P$. Finally, with active control there is no problem with the cylinder "outrunning" the vortex shedding because the vortex shedding frequency is imposed externally. Considering the oscillatory forcing case, where $C_l$~1 and the vortex shedding frequency is increased by 50% to St~0.3, it appears from eqn. (11) that $C_P$~0.5 which is now comparable to the Betz limit of 0.593. Furthermore, apart from physical size constraints, there is no cap on the maximum power that can be generated.

Referring now to FIG. 2, there is illustrated a schematic drawing of a device 150 for extracting energy from an incoming fluid flow, according to some embodiments of the present invention.

The device 150 includes an oscillator having a main body 152 and a joining element 154. The main body 152 is anchored to a base (or support) 156 via the joining element 154, and faces (is exposed to) and is subjected to an incoming fluid flow 118. The joining element 154 is configured for enabling the main body 152 to oscillate with respect to the base 156, when perturbed from a rest state thereof. The perturbations of 25 the main body 152 are caused by the vortices formed by the fluid flow in the wake of the main body 152.

On the surface of the oscillator's main body 152, there is provided a flow affecting unit 158 configured for being activated and deactivated to thereby selectively affect a separation of streams of the fluid flowing over said main body's surface. The 30 flow affecting unit 158 can affect the separation by increasing (encouraging) a degree of separation and/or decreasing a degree of the separation (encouraging attachment), as will be explained below in the examples illustrated by FIGS. 3a-3b. Optionally, one or more additional passive flow affecting elements (not pictured here, but shown in FIG. 5a) may be also located on the surface of the main body 152 in order to further contribute the separation or attachment of streams of the fluid flowing over said main body's surface. The passive flow affecting element cannot be activated or deactivated, and is generally a certain physical feature of the surface of the main body 152 (e.g. roughness of the main body's surface, one or more protrusions on the main body's surface, etc.) which permanently affects the flow over the main body's surface. Depending on the structure and/or position of the passive flow affecting element, the passive flow affecting element can either increase or decrease a degree of flow separation, or move the location at which the flow separates to a desired location.

A control unit 160 is provided being in communication with the above-described operative flow affecting unit 158, and is configured for activating and deactivating the operative flow affecting unit 158 according to a certain time pattern. In this manner, the control unit 160 controls a flow state of the fluid over the main body's surface and thereby enables controllable change of the frequency at which vortices are formed (vortex formation frequency) in the wake of the main body 152. The vortex formation frequency can therefore be selected/adjusted to cause an increase in the oscillator's oscillation at least in a direction perpendicular to the incoming fluid flow. In a preferred embodiment of the present invention, the vortex formation frequency is selected to approach the oscillator's natural frequency, thereby forcing an artificial "lock-on" condition. When the vortex formation frequency approaches the oscillator's natural frequency, the oscillation frequency of the oscillator follows suit and naturally settles around a value that is close to that of the oscillator's natural frequency.

Optionally, the device of the invention may further include or be connectable to an energy extraction unit 162 which in this example is joined to the oscillator assembly (either to the main body 152 or to the joining element 154), and is configured for converting the motion of the oscillator into useful energy.

Though in FIG. 2 the main body 152 is shown to have a circular cross section and may be assumed to be a cylinder-like structure, it should be clear than the main body can assume any shape, being elongated or not. Possible shapes may be a sphere, an airfoil, a cylinder having an oval or ellipsoidal shape, a polygonal prism, or a prism having a polygonal-like cross-section sporting both straight and curved sides, etc.

The joining element 154 is configured such that when the main body 152 is perturbed from a rest state thereof, it allows the main body 152 to oscillate about its rest state. In a variant explained below with reference to FIG. 10, the joining element 154 is, for example, a spring joined to the base 156, in which case the oscillator is a spring based oscillator. In another variant explained below with reference to FIGS. 11*a*-11*b*, 12, 13*a*-13*b*, 14, the joining element 154 is a stalk joined to a pivot in the base 156 and 5 rotatable about the pivot in at least on plane, in which case the oscillator is a pendulum.

The operative flow affecting unit 158 includes one or more flow interacting elements placed at different locations on the surface of the main body 152, each element interacting with and affecting the flow at (or near) the element's location. The activation of each such element may be performed by an actuator comprised in the operative flow affecting unit 158 mechanically (e.g. by hydraulic forces) or electronically (by an external field such as electromagnetic field or electric current). The flow affecting unit 158, when activated, may affect the flow separation over the surface of the main body 152 by forcing the fluid to separate from the surface of the main body 152 and/or by increasing a degree of attachment of the fluid to the surface of the main body 152. This can be achieved in a variety of fashions: for example by changing the shape of the main body (see FIGS. 5*a*-5*b*, 6*a*-6*b*), by expelling a fluid from a plenum of the main body 152 into the streams flowing over the main body and/or extracting fluid from the streams into the plenum (see FIGS. 7*a*-7*b*, 8), by creating and accelerating a plasma over the main body's surface (see FIG. 9).

The control unit 160 is in communication with the flow affecting unit 158 in either a wired or wireless fashion, and sends a control signal to the actuator of the flow affecting unit 158, instructing the activation or deactivation of the one, some, or all of the flow interacting elements of the flow affecting unit 158. The control unit 160 may be integral with the main body 152 of the oscillator, or may be located outside the main body 152. The control unit 160 activates and deactivates the flow affecting unit 158 according to a certain time pattern (which may or may not be periodic), in order to attain a desired vortex formation frequency. In a variant, the pattern is either selected a priori. In another variant, the pattern is determined in situ (i.e. during the oscillation), as will be explained below, with reference to FIG. 4. Optionally, the activation and deactivation of the flow affecting unit 158 occurs periodically, at a certain activation frequency. Such activation frequency is related to the vortex formation frequency that is yielded as an effect of the time-dependent activation and deactivation of the flow affecting unit 158. Therefore, a desired vortex formation frequency is obtained by controlling the frequency of activation and deactivation of the flow affecting unit. In some cases, the activation frequency is equal to the vortex formation frequency.

The energy extraction 162 unit may be any known unit capable of converting motion to energy or one kind motion to another kind of motion. Non-limiting examples of such energy conversion techniques include conversion by one or more compressors (see FIGS. 13*a*-13*b*), by a linear electrical generator, conversion of linear motion to rotation (e.g. rack and pinion, flywheel) or using piezoelectric to convert mechanical strain into electric current or voltage. If conversion of linear motion to rotational motion is used, for example by using a flywheel, a conventional generator may be used for converting the rotational motion into electric power. Alternatively, rotational motion may be used directly, for example for driving a useful load, such as a pump for pumping water or oil from a well, or a drill.

Figure 3A:
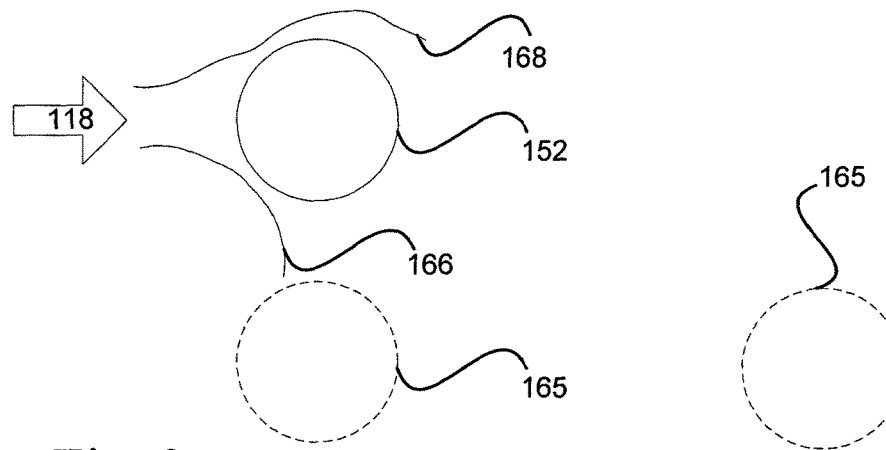
FIGS. 3a-3b are schematic drawings illustrating an example of a mode of operation of the present invention.
Figure 3B:
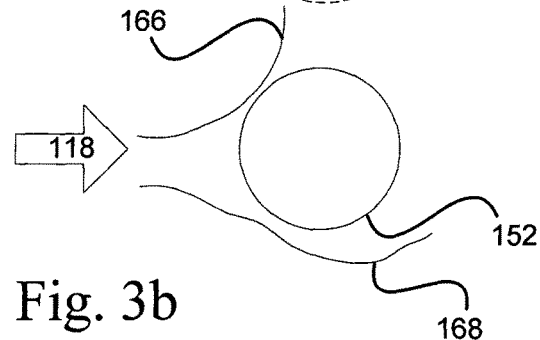

Referring now to FIGS. 3*a* and 3*b*, an example of a mode of operation of the present invention is illustrated, for the simplified case in which the oscillator's oscillations are along one path (line) and centered around a rest position located on the path of oscillations. This is a so-called one- or two-dimensional oscillation (i.e. within a plane). It should be noted, however, that generally, the oscillations are three-dimensional and the center of oscillation is generally not located on the path of oscillation. In some cases, the oscillations are chaotic, i.e. the oscillator's main body does not periodically perform the same motion.

According to some embodiments of the present invention, the control of the flow affecting unit 158 is performed as following. When the main body 152 is perturbed and moved away from its rest position 165, the flow control is applied in order to ensure that for a certain time interval, flow attachment of the fluid flowing over the side facing the rest position 165 is lower than flow attachment of the fluid flowing over the side facing away from the rest position 165. Said in another way, the control is aimed at ensuring that for a certain time interval, flow separation of the fluid flowing over the side facing the rest position 165 is higher than flow separation of the fluid flowing over the side facing away from the rest position 165. Fluid flowing over the side facing the rest position 165 is depicted by the stream line 166. Fluid flowing over the side facing away from the rest position 165 is depicted by the stream line 168. In this manner, a force is created pushing the main body 152 further away from its rest position and increasing the amplitude of the oscillation. The duration of the creation of this force should be limited, so that damping of the oscillation is not overly increased.

The above described mode of operation can be achieved in the following ways: activating one or more flow-separating elements of the flow affecting unit 158 located on the side of the main body 152 facing the rest position and/or activating a flow-attaching element of the flow affecting unit located on the main body's side facing away from the rest position.

Figure 4:
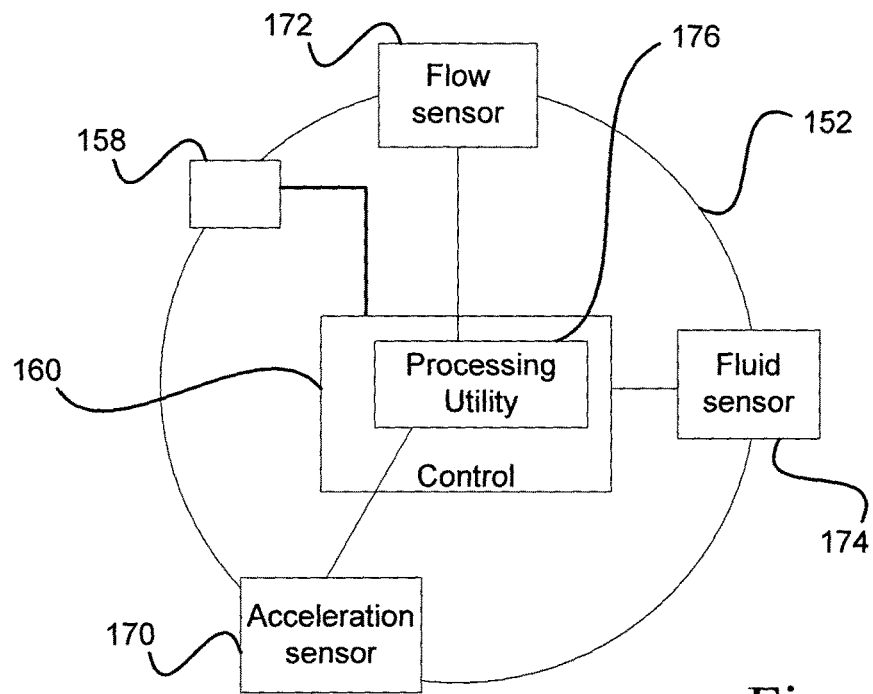
FIG. 4 is a block diagram illustrating an example of present invention, in which the control unit is in communication with one or more sensors and the pattern of activation and deactivation of the activable flow affecting unit is determined according to data received by the sensors.

Referring now to FIG. 4, there is illustrated an example of present invention, in which the control unit 160 is in communication with one or more sensors and the pattern of activation and deactivation of the operative flow affecting unit is determined according to data received by the sensors.

In the example of FIG. 4, the control unit 160 is in communication with one or more sensors and receives data from each sensor. The sensors may include a motion sensor 170 sensing the acceleration and optionally the velocity of main body 152, and/or a flow sensor 172 sensing a property of the fluid flow (e.g., incoming flow velocity and/or flow velocity at one or more locations along the main body's surface), and/or a fluid sensor 174 sensing a property of the fluid (e.g. density, temperature, etc.). The data supplied by the sensor(s) to the control unit 160 is processed by a processing utility 176 according to a predetermined algorithm to determine a suitable (or optimal) activation pattern being a pattern of activation/deactivation of the operative flow affecting unit which can be used to affect the flow over the streams flowing over the surface of the main body 152, in order to attain the desired vortex formation frequency. Optionally, the processing utility 176 uses the data supplied by the sensor(s) to calculate further parameters of interest (e.g., the relative speed of the flow with respect to the main body's motion) that can be used as an input to the above-mentioned algorithm. It should be noted that such activation pattern is a time pattern of an applied effect (stimulus) with respect to a specific flow interacting element of the operative flow affecting unit, or in case the operative flow affecting unit includes multiple flow interacting elements located at different positions, the pattern is actually a certain function of time and position.

The sensors 170, 172, and 174 may be located on the surface of the main body 152, or located remotely from it. The communication between the sensors 170, 172, 174, and the control unit 160 may be wired or wireless.

Figure 5A:
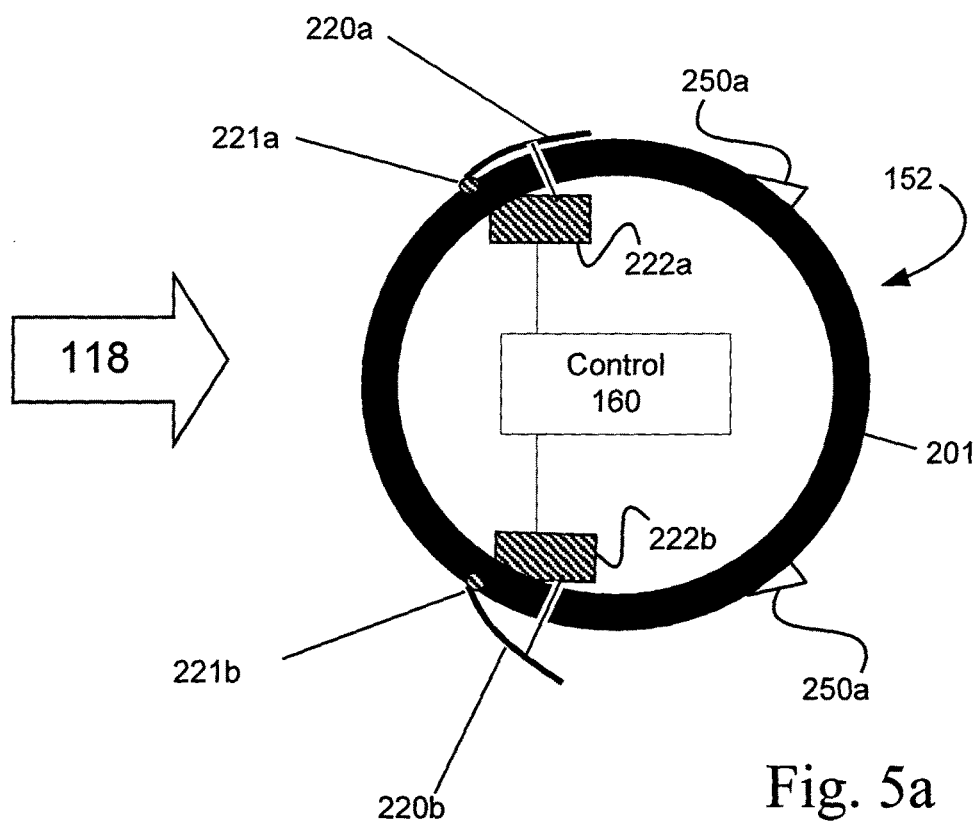
FIGS. 5a-5d are schematic drawings illustrating an example of the present invention, in which flow over the oscillator is affected via one or more retractable flaps.
Figure 5B:
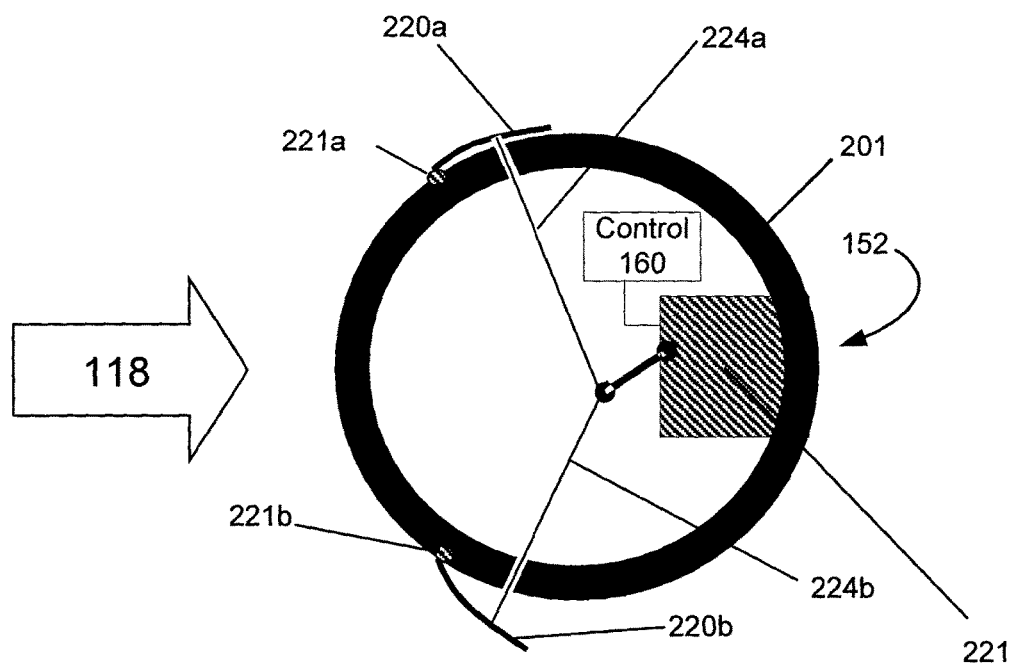
Figure 5C:
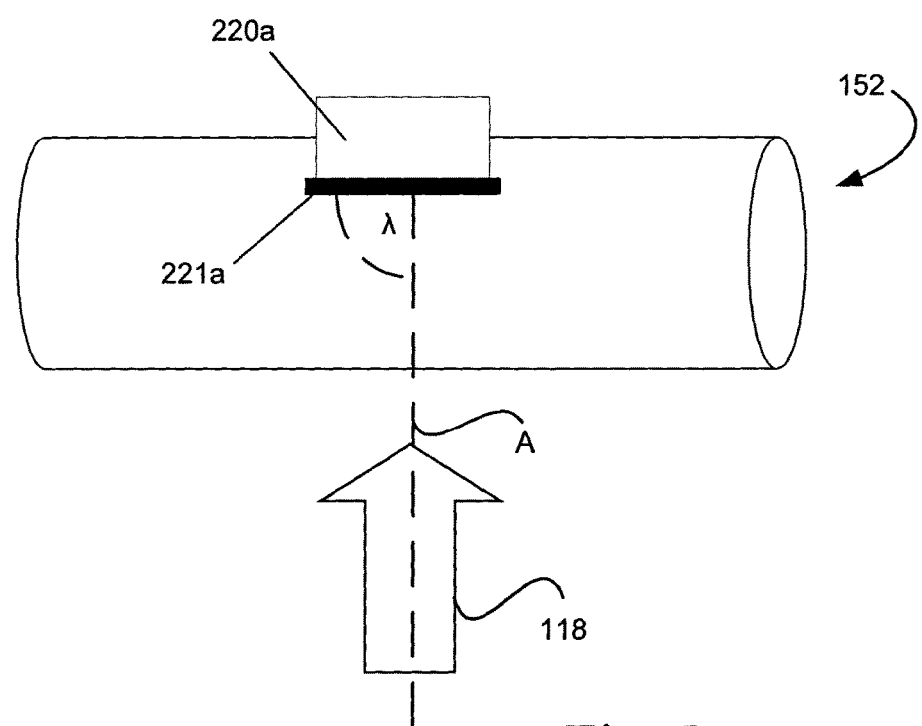
Figure 5D:
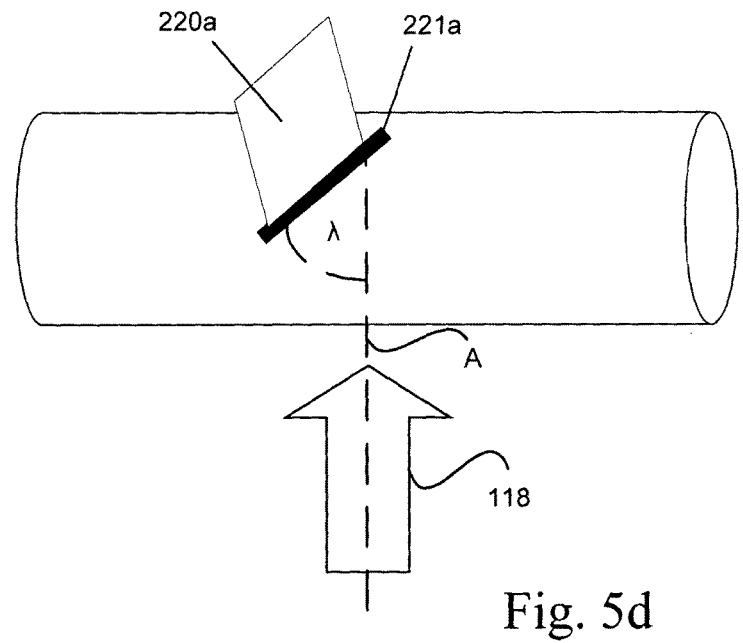

Referring now to FIGS. 5a-5d, schematic drawings are shown illustrating an example of the present invention, in which flow over the oscillator is affected via one or more retractable flaps. In FIG. 5a, two retractable flaps are each independently manipulated by different actuators. In FIG. 5b, two retractable flaps are manipulated by a single actuator such that when one flap is deployed the other flap is folded. In FIG. 5c, at least one of the flaps is configured for encouraging flow separation. In FIG. 5d, at least one of the flaps is configured as a vortex generator encouraging flow attachment.

The main body 152 includes a shell 201. The operative flow affecting unit 158 of FIGS. 2 and 3 includes flow interacting elements in the form of a first retractable flap 220a, and a second retractable flap 220b, and includes one or more actuators configured for manipulating the flaps 220a and 220b. In FIG. 5a, the first flap 220a is manipulated by a first actuator 222a while the second retractable flap 220b is manipulated by a second actuator 222b, and the actuators 222a and 222b operate independently from each other, according to instructions from the control unit 160. In FIG. 5b, both flaps 220a and 220b are manipulated by a common actuator 221, via mechanical links 224a and 224b respectively, such that when one flap is deployed the other flap is folded. The flaps 220a and 220b are preferably located substantially symmetrically to each other with respect to the direction of the fluid flow 118. The first flap 220a is movably connected to the surface of the shell 201 via a first hinge 221a. The second flap 220b is movably connected to the surface of the shell 201 via a second hinge 221b.

As explained above, with reference to FIG. 2, one or more passive flow affecting elements can optionally be added to the surface of the shell 201. In the example of FIG. 5a, two such passive flow affecting elements are used in the form of vortex generators 250a and 250b, which encourage flow attachment. The shape and geometry of the passive flow affecting elements can be also chosen to encourage flow separation.

In FIGS. 5a and 5b, the second flap 220b is seen deployed (activated), while first flap 220a is in folded position (deactivated), presenting minimal resistance to the flow of fluid. Optionally, hinges 221a and 221b and flaps 220a and 220b are configured to fit into recess or recesses (not seen in this figure) in the shell 201, such that they present minimal disturbance to the fluid flow while in folded position. Actuators 221, 222a, and 222b may move the flaps electro-mechanically (e.g. via an electric motor or solenoid), pneumatically, hydraulically, or piezoelectrically, or according to other suitable techniques known in the art.

Optionally, a plurality of actuators is connected to at least one of the flaps. This may be advantageous when a long flap is used, as the orientation of each section of the flap can be controlled independently. Alternatively, on each side of the shell 201 a plurality of flaps may be provided being arranged side by side along the perimeter of the shell 201. Optionally, the orientation of the flaps 220a and 220b can be controlled, so that each flap has a folded mode and a plurality of deployed (active) modes, each deployed mode corresponding to a certain orientation of the flap with respect to the surface of the main body 152.

Optionally, more than two (for example four) flaps are used. Having more flaps may be useful to more efficiently affect the vortexes. For example, different flaps 220 placed at different locations along the shell 201 with respect the direction of the fluid flow 118 may be activated at different conditions of the fluid flow (e.g. different ranges of fluid flow speeds), in order to attain a desirable vortex formation frequency. Optionally, additionally or alternatively, several flaps may be activated together or synchronously to increase the efficiency of separation control. In some embodiments, the flaps are deployed and retracted in a periodic fashion, at a certain activation frequency. Such activation frequency causes vortices to form at a vortex formation frequency that is related (e.g. equal) to the activation frequency of the flaps.

In a variant, when flaps 220a and 220b are in their deployed state, they increase separation between the main body's surface and the streams of fluid flowing over the main body's surface. In another variant, the flaps 220a and 220b may be used instead as retractable vortex generators, configured for promoting flow attachment to the main body 152, when deployed. Such two variants are illustrated in FIGS. 5c and 5d, respectively. In FIG. 5c, when the flap 220a is deployed, the surface of the flap faces the incoming fluid 118 such that an angle A between the line A parallel to the relative velocity of the flow with respect to the main body 152 and the hinge 221a of the flap 220a is about 90 degrees. In such case, the flap 220a promotes flow separation. In FIG. 5d, the surface of the flap is tilted at an acute angle (preferably not exceeding 45 degrees) with respect to the direction/axis of propagation of the incoming fluid 118, such that an angle A between the line A parallel to the relative velocity of the flow with respect to the main body 152 and the hinge 221a of the flap 220a is substantially different than 90 degrees (e.g., in the range between 0 and 45 degrees). In such case, the flap 220a is a vortex generator which increases the momentum of the fluid flowing over the surface of the main body 152, and thereby promotes flow attachment.

In some embodiments of the present invention, a combination of vortex generators capable of promoting flow attachment to the cylinder and flaps capable of promoting flow separation from the cylinder are used together. For example, the main body 152 is divided by the direction of the relative speed of the incoming fluid flow into two sides opposite to each other: a first side and a second side. If at a certain point in time it is deemed that in order to increase the oscillation's amplitude, the flow attachment one the first side of is to be higher than the flow attachment on the second side for a certain time period, then the following action may be performed: a flap is deployed on the second side to decrease attachment on the second side, and a vortex generator is deployed on the first side to increase attachment on the first side. If at another point in time it is deemed that in order to increase the oscillation's amplitude, the flow attachment one the first side of is to be lower than the flow attachment on the second side for a certain time period, then the deployment (activation) of the vortex generator and the flap is reversed.

Figure 6A:
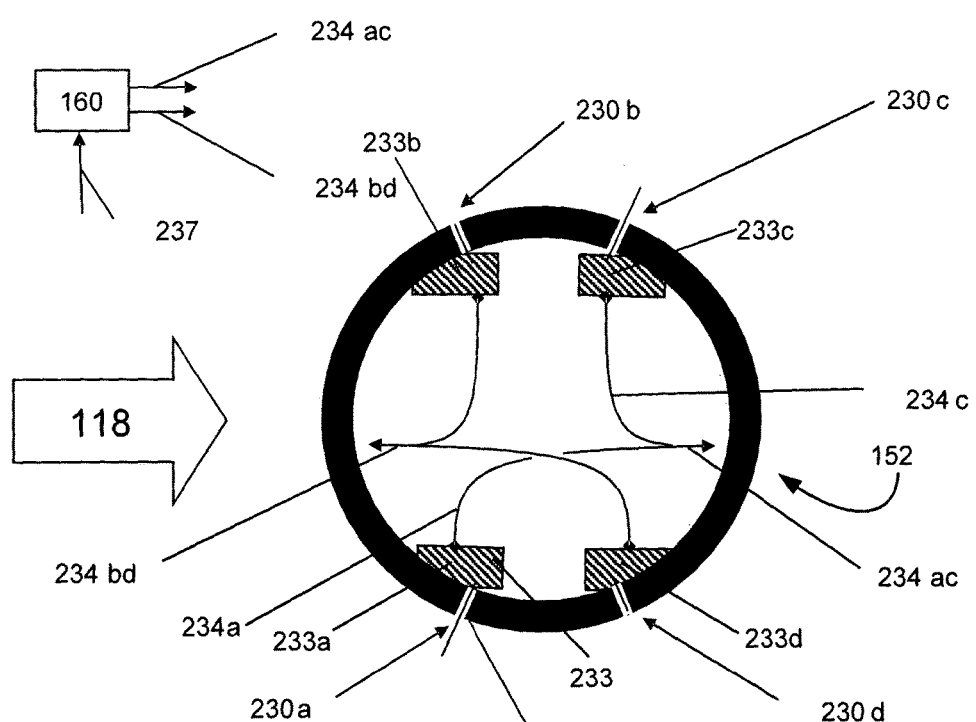
FIGS. 6a-6b are schematic drawings illustrating an example of the present invention, in which flow over the oscillator is affected via one or more retractable protrusions, which may be configured either to increase or decrease flow separation over the main body of the oscillator.
Figure 6B:
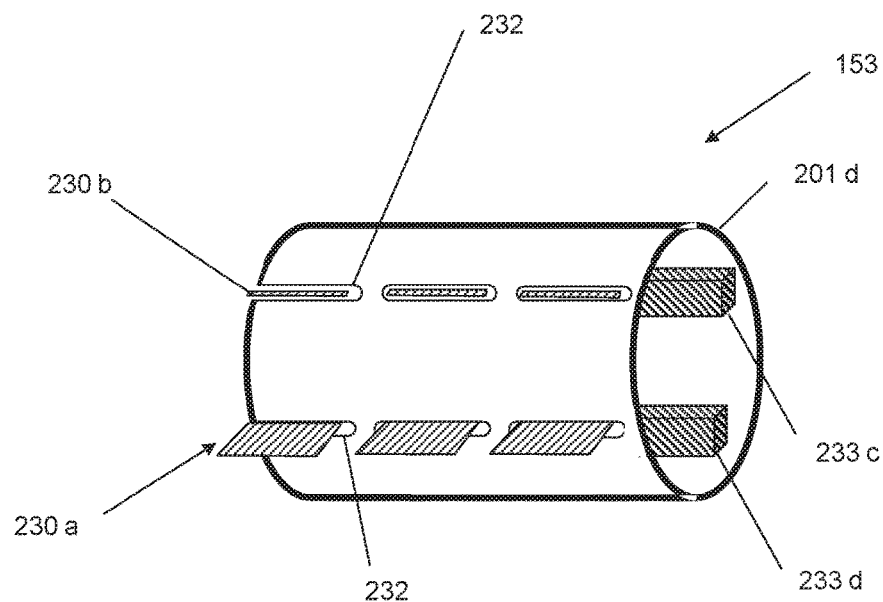

Referring now to FIGS. 6*a*-6*b*, schematic drawings are shown illustrating an example of the present invention, in which flow over the oscillator is affected via one or more retractable protrusions, which may be configured to increase or decrease flow separation over the main body of the oscillator. FIG. 6*a* shows a cross section of the main body 152. FIG. 6*b* shows an isometric view of the main body 152.

The operative flow affecting unit 158 of FIG. 2 includes one or more flow interacting elements in the form of deployable protrusions (in this case, four deployable protrusions 230*a*, 230*b*, 230*c*, 230*d*) and includes one or more actuators (233*a*-233*d*) such that the actuator activates one or more of the protrusions, where each protrusion is capable of extending from or retracting to a corresponding recess such as slot or groove (generally 232). Protrusions 230*a*-230*d* may be in a form of a thin plate extending along some length of the main body 152. In the depicted drawing, flow interacting protrusions 230*a* and 230*c* are deployed, while protrusions 230*b* and 230*d* are in a folded 30 (retracted) position, presenting minimal resistance to the flow of fluid. The protrusions 230*a*-230*d* are optionally vortex generators, configured for promoting flow attachment to the main body 152.

Optionally, some of the protrusions are configured for being deployed together. For example, the actuators 233*a* and 233*c* are connected to the control unit 160 via cables 234*a* and 234*c* which merge into a cable234*ac*. In this manner the protrusions 230*a* and 230*c* are deployed together. Similarly, the actuators 233*a* and 233*c* may be connected to the control unit 160 via cables 234*b* and 234*d*, which merge into cable 234*bd*, such that the protrusions 230*b* and 230*d* are deployed together. Optionally, the control signal by the control unit 160 is such that the protrusions 230*a* and 230*c* are deployed when the protrusions 230*b* and 230*d* are retracted. Although FIG. 6*a* shows a configuration in which the protrusions 230*a* and 230*c* are deployed and the protrusions 230*b* and 230*d* are retracted, other actuation configurations and actuation sequences are possible.

Optionally, the length of the protrusions 223*a*-*d* which is subjected to the fluid flow can be controlled, so that each protrusion has a folded mode and a plurality of deployed (active) modes, each deployed mode corresponding to a certain length of the protrusions that extends out of the surface of the main body 152.

Similarly to the actuators 221, 222*a*, and 222*b* of FIGS. 5*a*-5*b*, the actuators 233*a*-*d* may be electromechanical, pneumatic, hydraulic, or piezoelectric actuators or other actuators known in the art.

For example, as shown in the figure, protrusions 230*a* to 230*d* are arranged symmetrically with respect to the direction of the fluid flow 118.

Control unit 160 may receive signals 237 from one or more sensors, as described above with reference to FIG. 4, and operate the actuators 233*a*-233*d* accordingly.

It should be noted that operation of the actuators 233*a*-233*d* is preferably synchronized to the (desired) frequency of vortex shedding. In some embodiments, the protrusions are deployed and retracted in a periodic fashion, at a certain activation frequency. Such activation frequency causes vortices to form at a vortex formation frequency that is related (e.g. equal) to the activation frequency of the protrusions.

Figure 7A:
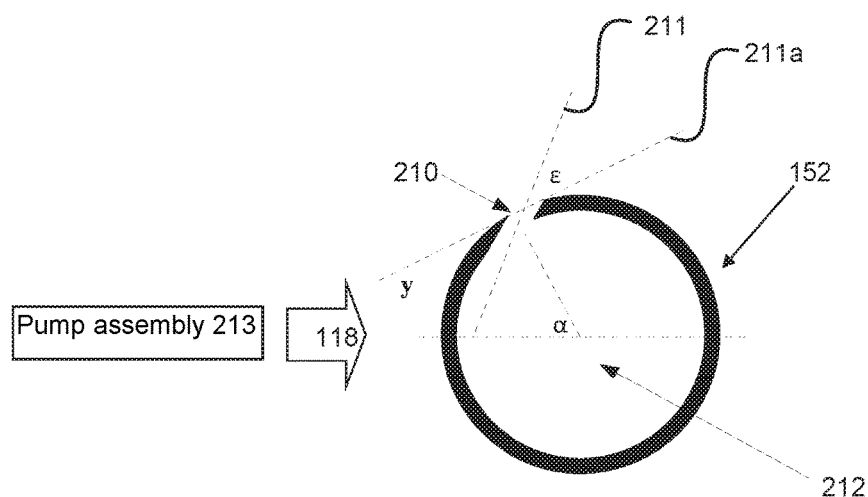
FIGS. 7a-7b are schematic drawings illustrating an example of the present invention, in which flow over the oscillator is affected by pumping a fluid into or out of a slot or array of slots located on the oscillator's main body.
Figure 7B:
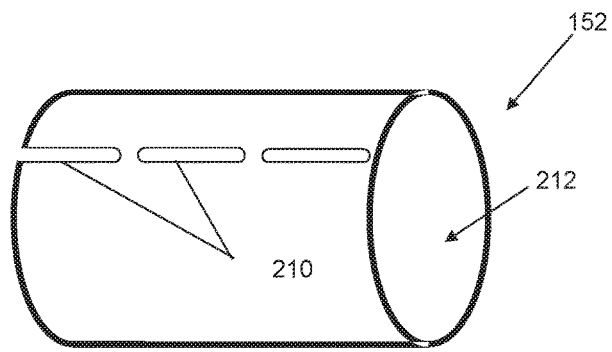

Referring now to FIGS. 7*a*-7*b*, schematic drawings are shown illustrating an example of the present invention, in which flow over the oscillator is affected by pumping a fluid into or out of flow interacting element(s) in the form of a slot or array of slots located on the oscillator's main body.

FIG. 7*a* illustrates a cross section of the main body 152 in which the operative flow affecting unit 158 of FIG. 2 includes a single flow interacting element being a slot 210 opened to the internal plenum 212 of the main body 152, and also includes an actuator (not pictured). FIG. 7*b* illustrates an isometric side view of the main body 152 depicted in FIG. 7*a*.

In a variant, the slot 210 may run along the entire length of main body 152, or along a part thereof. In another variant, a plurality of elongated slots 210 may be disposed along a surface region of the main body. In a further variant, the slot 210 may be in the form of a circular orifice, and a plurality of such orifices may be disposed along a surface region of the main body. Having a plurality of "short" or circular slots instead of one long slot increases the mechanical rigidity of the main body to 152.Optionally, the main body 152 may have internal support structure (not seen in this figure) to increase its mechanical strength.

According to some embodiments of the present invention, the actuator is a pump 213. Fluid, optionally of the same type as the fluid that flows over the main body 152, may be pumped into plenum 212 by the pump 213, and is blown through slot 210 influencing the fluid flow over the main body. Generally, if the fluid exits the slot 210 in a direction which is along the fluid flow over the main body's surface, then the momentum of the fluid flow along the main body's surface is increased, and attachment is encouraged. Conversely, if the fluid exits the slot 210 in a direction which is against the fluid flow over the main body's surface, then the momentum of the fluid flow along the main body's surface is decreased, and separation is encouraged. In the example of FIG. 7*a*, the incoming fluid flow 118 has a relative velocity with respect to the main body having a direction from left to right. In such an example, if the angle $\epsilon$ that the slot's axis 211 forms with tangent 211*a* to the main body's surface at the location of the slot is in the range $0° < \epsilon < 90°$, then the fluid blown through the slot 210 increases the momentum of the fluid flowing over the main body 152 and increases flow attachment. If the angle $\epsilon$ is in the range $90° < \epsilon < 180°$, then the fluid blown through the slot 210 decreases the momentum of the fluid flowing over the main body 152 and increases flow separation. Optionally the pump 213 pumps out fluid from plenum 212 creates an negative pressure in plenum 212, such that a portion of the fluid flowing over the main body 152 is sucked into the plenum 212, thus influencing the flow of said fluid. In some embodiments, the suction and/or blowing are performed in a periodic fashion, at a certain activation frequency. Such activation frequency causes vortices to form at a vortex formation frequency that is related (e.g. equal) to the activation frequency.

It should be noted that when the activable flow affecting unit is activated, fluid is blown out of or sucked into the slot. Conversely, when the activable flow affecting unit is disactivated, no fluid is blown out of or sucked into the slot. Optionally, the activable flow affecting unit has a plurality of active modes, each sporting a different blowing or sucking speed via the slot.

According to some embodiments of the present invention, the actuator is an acoustic speaker, located within the main body and configured for introducing acoustic waves into the fluid flow via the slot. Similarly to the case in which fluid is blown out of the slot 210, if the acoustic waves leaving the slot 210 propagate in a direction which is along the direction of the fluid flow over the main body's surface, then flow attachment is encouraged. Otherwise, flow separation is encouraged. In the example of FIG. 7a, the incoming fluid flow 118 has a relative velocity with respect to the main body having a direction from left to right. In such an example, if the angle $\epsilon$ that the slot's axis 211 forms with a tangent 211a to the main body's surface at the location of the slot is in the range $0°<\epsilon<90°$, then the acoustic wave exiting the slot 210 increases the momentum of the fluid flowing over the main body 152 and increases flow attachment. Conversely, If the angle E is in the range $90°<\epsilon<180°$, then the acoustic wave exiting the slot 210 decreases the momentum of the fluid flowing over the main body 152 and increases flow separation.

Figure 8:
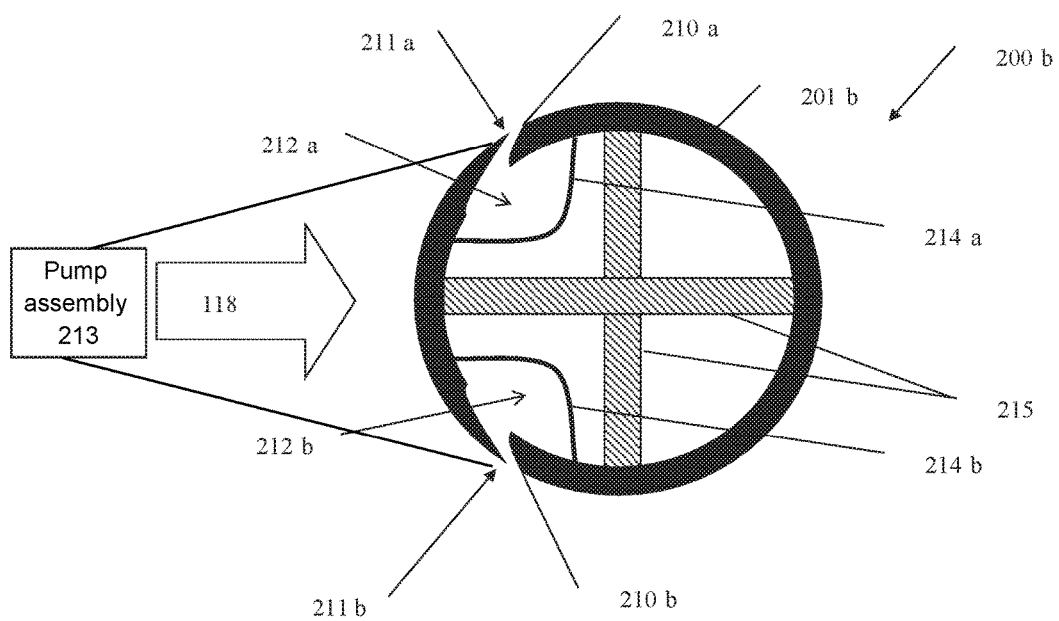
FIG. 8 is a schematic drawing illustrating an example of the present invention, in which flow over the oscillator is affected by alternately pumping fluid into or out of two slots or two slot arrays arranged over opposite sides of the oscillator's main body.

Referring now to FIG. 8, there is provided a schematic drawing illustrating an example of the present invention, in which flow over the oscillator is affected by alternately pumping fluid into or out of two slots or two slot arrays arranged over opposite sides of the oscillator's main body with respect to the direction of the incoming fluid flow.

The main body 152 of FIG. 8 comprises at least two slots 210a and 210b, and one or more actuators (not pictured) associated with said slots. The slots 210a and 210b are optionally located at opposite sides of the main body with respect to the direction of the incoming fluid low 118. The slots 210a and 210b and the actuators are included in the operative flow affecting unit 158 of FIG. 2. Optionally, the slots 210a and 210b are located substantially symmetrically with respect to the direction of fluid flow 118.

For example, each actuator may be configured as a pump assembly 213. According to some embodiments of the present invention, the slot 210a opens into a plenum 212a formed between the main body's outer shell 201 and a wall 214a. Similarly, the slot 210b opens into a plenum 212b formed between the main body's outer shell 201 and a wall 214b. Plenums 212a and 212b are separated, and each plenum is connected to a fluid pump 213 that pumps fluid out of or into the slots 210a and 210b respectively in a manner similar to the activation of slot 210 in the example of FIGS. 7a-7b. However, compared to the embodiment of FIGS. 7a-7b, the configuration of FIG. 8 allows greater efficiency and flexibility as it enables control of the flow conditions on both sides of main body 152.

Optionally, actuators may be zero mass-flux devices, simultaneously blowing and sucking fluid from the exterior of device 200. In some embodiments, the two slots 210a and 210b are connected to a two-sided pump 213 such as an actuated piston, bellows or diaphragm, so that when the pump 213 is activated in a first direction it sucks fluid from slot 210a and blows fluid out of slot 210b. When the pump 213 is activated in a second direction it sucks fluid from slot 210b and blows fluid from slot 210a.

In a variant, the actuator is an acoustic speaker located within the main body and configured for emitting an acoustic wave which leaves the main body via the slot.

Optionally, more than two (for example four) slots are used. Having more slots may be useful to more efficiently affect the vortex formation aft of the main body. For example, different slots at different locations a may be provided being used at different ranges of the fluid flow speeds. Several such actuators may be used synchronously to increase the efficiency of control of the flow conditions over the main body 152.

Optionally, the main body 152 comprises internal support structures such as supports 215 to increase the strength and rigidity of main body 152. Optionally, supports 215 may act as walls 214 for forming the different plenums 212a and 212b.

Figure 9:
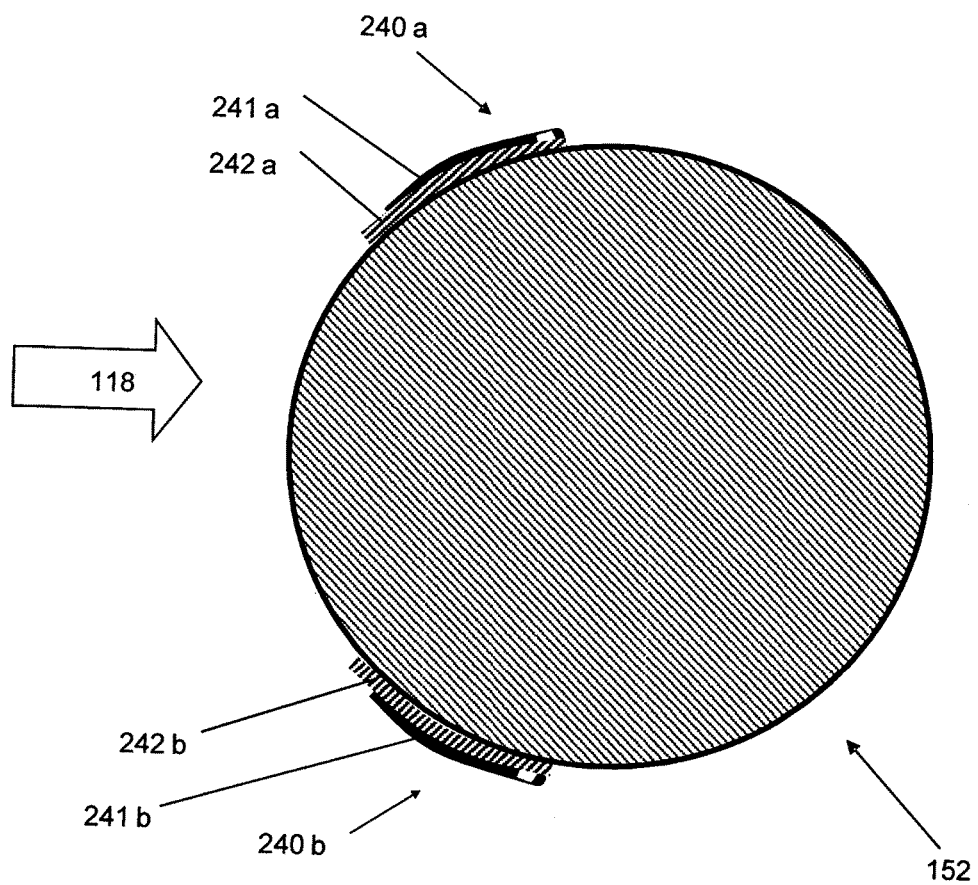
FIG. 9 is a schematic drawing illustrating an example of the present invention, in which flow over the oscillator is affected by creating and accelerating plasma over the surface of the main body in order to decrease flow separation.

Referring now to FIG. 9, there is schematically illustrated an example of the device of the present invention, in which a flow over the oscillator is affected by creating and accelerating plasma over the surface of the main body in order to decrease flow separation. FIG. 9 schematically depicts a cross section of the main body 152, in which the operative flow affecting unit (158 of FIG. 2) includes at least one plasma flow controller located on the surface of the main body 152. In the specific but not limiting example of FIG. 9, two plasma flow controllers 240a and 240b are shown which are located on surface regions of the main body 152 opposite to each other with respect to the direction of the incoming fluid flow 118 (i.e. to be at opposite sides of the flow propagation axis).

At least part of the surface of the main body 152 is electrically conductive. Each of the plasma flow controllers 240a (240b) comprises an electrode on insulator assembly, i.e. an electrode 241a (241b) separated from the main body surface by an insulation layer 242a (242b). When a certain voltage is applied to the electrode creating a certain potential difference between the main body's surface and the electrode 241a (241b), plasma is created and accelerated along the surface of the main body 152, thereby affecting the fluid flow over the main body 152. If the plasma is accelerated along the stream of fluid flowing over the main body (e.g. towards the aft section of the main body), then momentum is added to the fluid flowing over the main body 152 and the flow attachment is increased. If the plasma is accelerated against the stream of fluid flowing over the main body (e.g., away from the aft section of the main body), then flow separation is increased.

While it is possible to control the operative flow affecting unit by turning the voltage on and off, further control may be provided by keeping the voltage on and changing the voltage between the electrodes and the main body's surface according to a time-dependent pattern.

Figure 10:
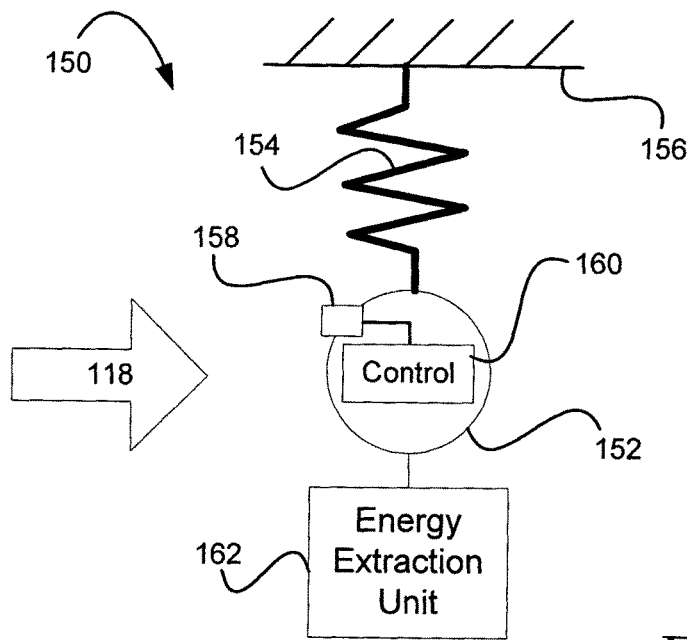
FIG. 10 is a schematic drawing illustrating an example of the present invention, in which the oscillator is a spring-based oscillator.

Referring now to FIG. 10, a schematic drawing illustrates an example of the present invention, utilizing a spring-based oscillator. As mentioned above with respect to FIG. 2, an oscillator in the device 150 of the present invention may be a spring-based oscillator. In this case, a joining element 154 is a spring having one end attached to a base 156 and a second end attached to a main body 152. The spring enables the main body 152 to oscillate in response to the formation of vortices in aft of the main body 152.

Figure 11A:
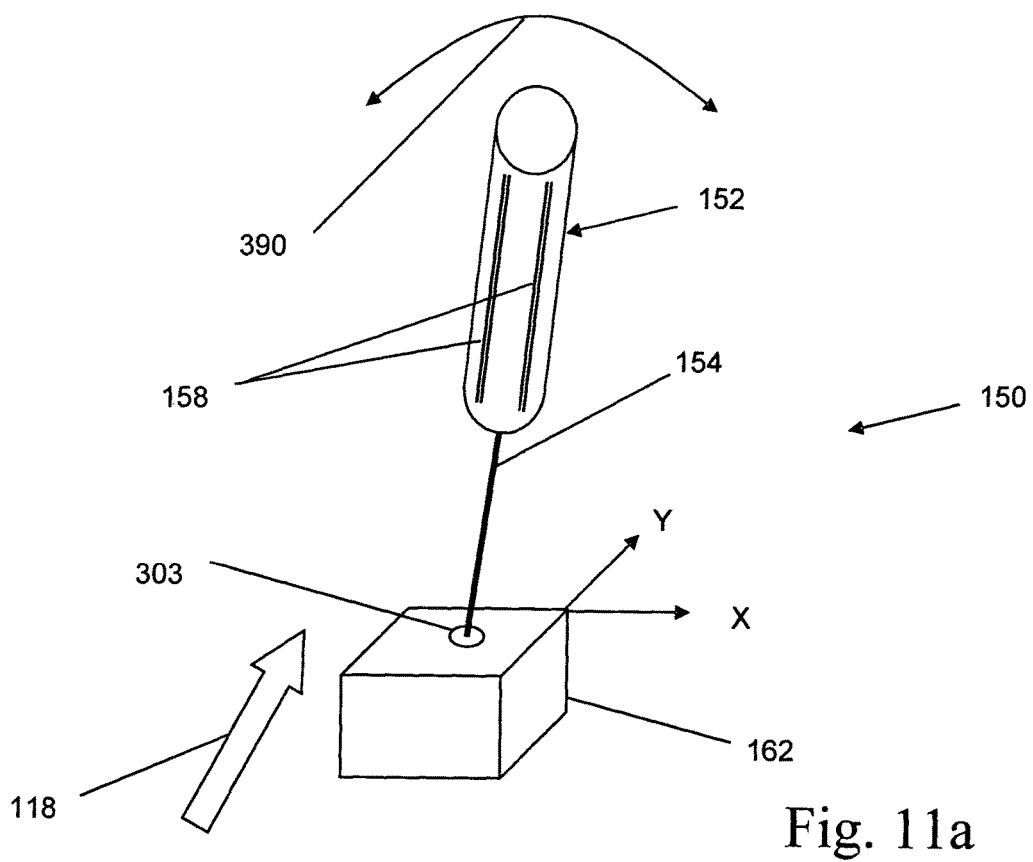
FIGS. 11a-11b are schematic drawings illustrating an example of the present invention, in which the oscillator is an upside-down pendulum.
Figure 11B:
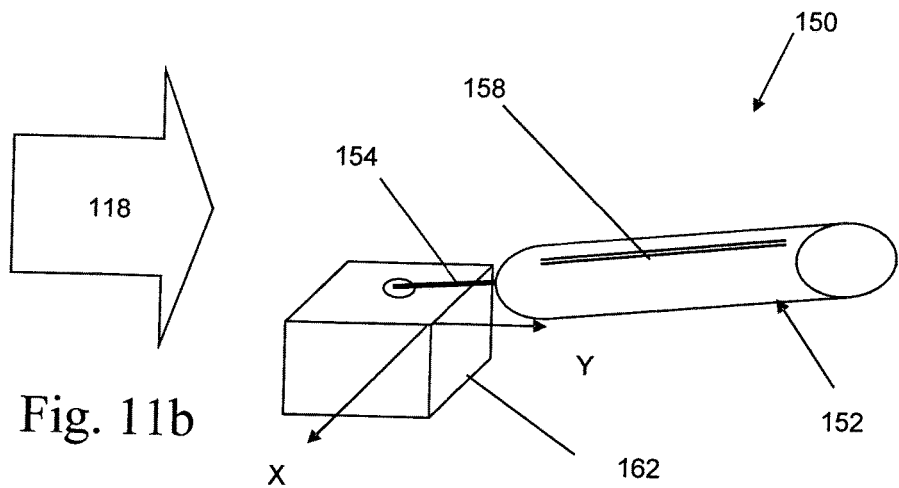

Reference is made to FIGS. 11a-11b which are schematic drawings illustrating an example of the present invention, in which the oscillator is an upside-down pendulum. FIG. 11a schematically depicts an isometric view of an energy extracting device 150 according to an exemplary embodiment of the current invention. FIG. 11b schematically shows the device 150 in a service position when the stalk is moved such that the main body is close to the ground.

In the device 150 of FIGS. 11a and 11b, the joining element 154 is a stalk holding the main body 152, and pivotally connected to an energy conversion unit 162 at a pivot 303 forming an inverted pendulum. The energy conversion unit 162 is configured similar to that of FIG. 2, and has a housing which functions as a fixed base (156 in FIGS. 2 and 10). The operative flow affecting unit 158 is located on the surface of the main body 152.

In operation, vortex shedding in the fluid flow 118 over the surface of the main body 152 induces an undulating motion (oscillation) 390 of the stalk 154 and main body 152 about pivot 303 around Y axis. The activation and deactivation of the operative flow affecting unit by the control unit (not shown) increases the amplitude of the pendulum's oscillations. The energy conversion unit housed within the base 156converts the motion of stalk 302 into useful energy form.

The service position at which the main body is set in FIG. 11b is achieved by rotating the pendulum around a second axis (e.g. the X axis, or the Y axis). The service position enables easy access to the operative flow affecting unit 158 and other structures of the main body 152 for installation and service. Additionally, this service configuration may be used when the velocity of the incoming fluid flow is particularly high (e.g., stormy weather) to reduce destructive forces on the device. If the device 150 is an underwater device, the oscillator may be set into its service position by flooding chambers within main body 152 and thus reducing its buoyancy.

Figure 12:
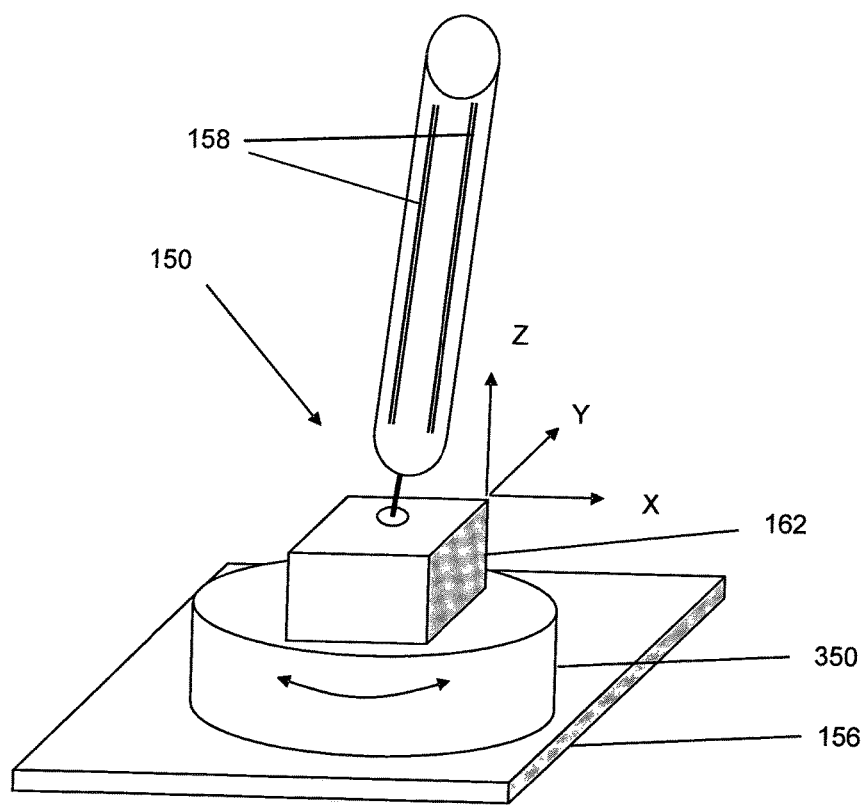
FIG. 12 is a schematic drawing illustrating an example of the present invention, in which the upside-down pendulum is rotatable so that the plane of oscillation is perpendicular to the fluid flow.

Referring now to FIG. 12, there is provided a schematic drawing illustrating an example of the present invention, in which the upside-down pendulum is rotatable so that the plane of oscillation is perpendicular to the fluid flow. In the example of FIG. 12, the device 150 is made to pivot around Z axis. For example, the energy conversion unit 162 may be placed on a turret 350 rotatable above the base 156. Addition of the rotatable turret 350 enables turning of the oscillator so that the operative flow affecting unit 158 can always be set at a desired orientation with respect to the fluid flow. Because the operative flow affecting unit 158 is typically set to best perform when it is at a certain orientation with respect to the incoming fluid flow, the rotatable turret 350 allows the operative flow affecting unit 158 to be turned towards the incoming fluid flow, no matter what the direction of the incoming fluid flow is. Therefore, the turret 350 enables the flow affecting unit 158 to operate efficiently, independently of the direction of the fluid flow. In this manner, energy extraction from a fluid flow which has variable direction (e.g. wind or underwater current) can be maximized.

Figure 13A:
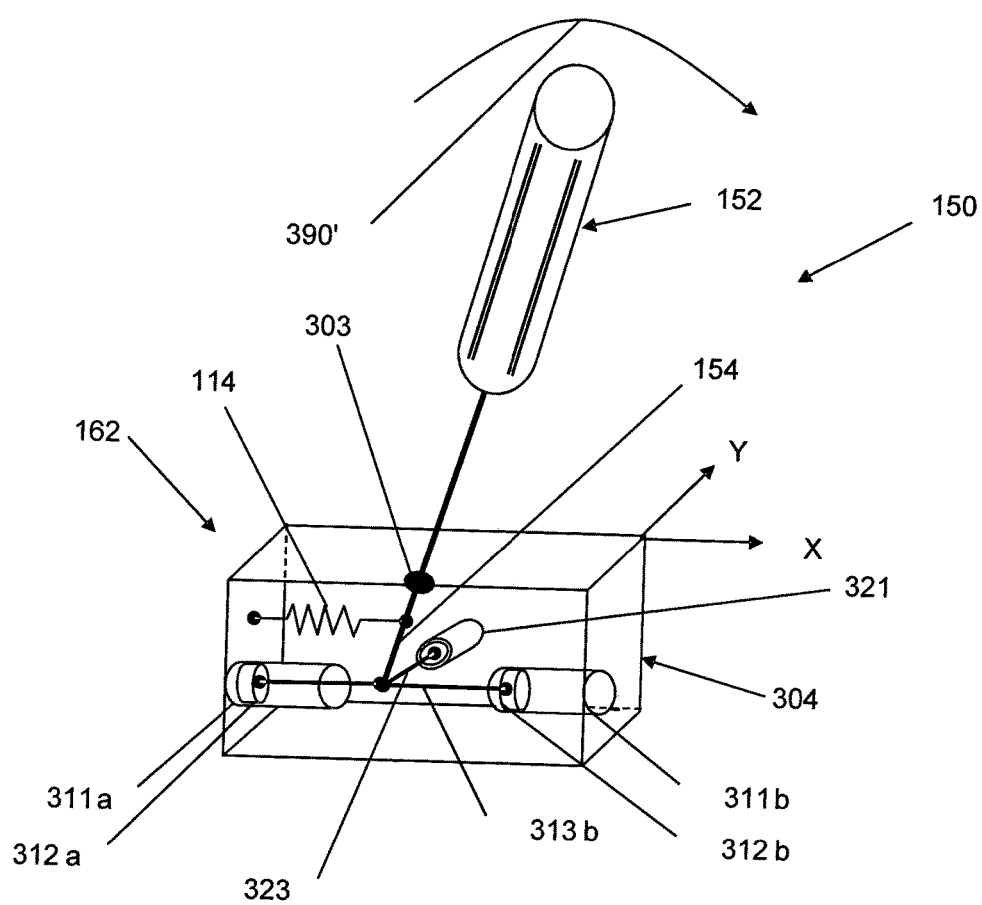
FIGS. 13a-13b illustrate examples of the energy conversion unit, according to some embodiments of the present invention.
Figure 13B:
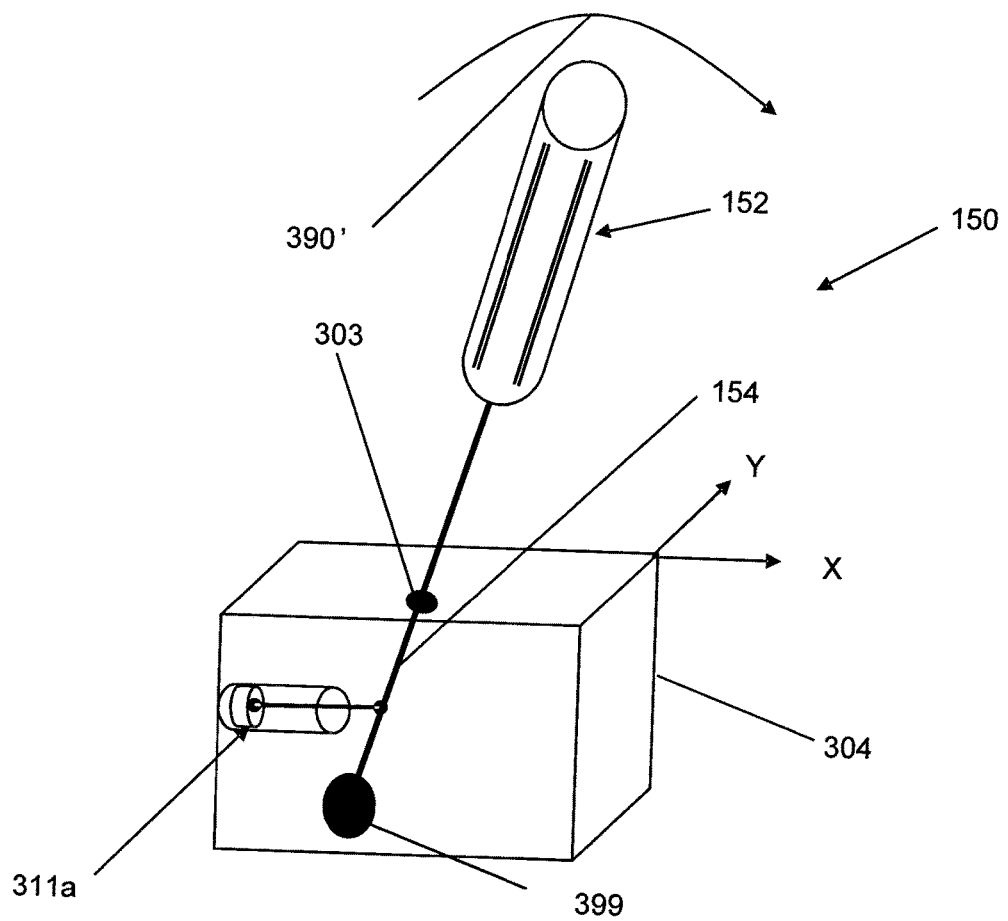

Referring now to FIGS. 13a-13b, examples of the energy conversion unit 162 are illustrated, according to some embodiments of the present invention. In FIG. 13a, an isometric cutout view of housing 304 shows left and right compressors 311a and 311b respectively. The left (right) compressor 311a (311b) comprises for example a cylinder with a piston 312a (312b) connected with a mechanical link 313a (313b) to a lower end of stalk 154. During a motion in a direction shown by arrow 390' (from left to right) of a main body 152, the left compressor 311a expels a working fluid (such as air, water or hydraulic fluid), while right compressor 311b sucks in the working fluid. One way valves and pipes (not pictured) direct the flow of the working fluid to a motor where the flow of the working fluid is used to produce useful energy such as mechanical rotation. Produced rotation may be used for example for generation of electricity using a generator, for oil or water pumping, for drilling, etc.

It should be noted that optionally, instead of the compressor or compressors, one or more pumps powered by the motion of the oscillator can be used to extract useful energy from the oscillator's motion.

Optionally, the returning force to the pendulum is supplied within the energy conversion unit 162 (which also defines a base). The returning force is a force which is applied to the main body 152 by the joining element 154 (in this case the stalk) in response to a certain motion (or certain change in motion) of the main body and which causes the main body to oscillate. Optionally, the returning force to the inverted pendulum is supplied by spring (or springs) 114 anchoring the stalk to the housing 304. Optionally, two springs are used, preferably anchoring the stalk 154 to the sides of the housing 304 which are opposite to each other. In FIG. 13a, it can be seen that when the main body is moved right from its vertical position (i.e. the position in which the stalk is vertical), the spring 114 is compressed by the leftward movement of the bottom section of the stalk (i.e. the section of the stalk 154 which is below the pivot 303). The compressed spring 114 tends to return to its non-compressed state and therefore produces a force which pushes the bottom section of the stalk rightwards, thereby pushing the main body 152 back toward its vertical position, i.e. causing it to oscillate around its vertical position (i.e. oscillation with respect to the base). Similarly, when the main body 152 is moved left from its vertical position, the spring 114 is extended by the rightward movement of the bottom section of the stalk (i.e. the section of the stalk 154 which is below the pivot 303). The extended spring 114 therefore produces a force which pushes the bottom section of the stalk leftward, thereby pushing the main body 152 toward its vertical position. The properties of the spring (e.g. its spring constant) determine the oscillation mode of the oscillator. Therefore a suitable oscillation mode of the oscillator of the device 150 may be selected by using one or more springs having desired properties (e.g., a desired spring constant).

The use of the spring 114 within the housing 304 this is only a non-limiting example of a technique for supplying a returning force. Optionally or alternatively a spring may be attached to the top section of the stalk or even to the main body itself. In a variant, the pivot 303 does not rotate and the stalk 154 is partially elastic. In such case, the returning force is provided by the tendency of the stalk 154 to return to its straight position when deformed by the movement of the main body 152. Additionally or alternatively, at least one of the compressors is closed (i.e., the fluid within the compressor always stays within the compressor). In such case, the returning force is provided by the resistance to compression and expansion of the gas located within at least one compressor.

In some embodiments, the device 150 is submerged in liquid such as sea or river water. In these embodiments, the main body 152 may be made buoyant (i.e., lighter than water) and the returning force is created by buoyancy. More specifically the upward force created by buoyancy is the force that causes the pendulum to perform oscillatory motion following a perturbation. In these cases, housing 304 is anchored to the sea or river floor or is made heavy to stabilize the device 150.

In some embodiments, the pivot 303 allows motion of stalk 154 also around the X axis. In such case, motion around X axis may be used for power conversion by compressor (or compressors) 321 seen connected to lower end of stalk 154 via a link 323. Optionally two such compressors are used. Returning force about X axis is applied similarly to that of axis Y. Enabling the rotation of the oscillator around the X axis is useful for harvesting energy created by back and forth motion due to varying drag forces created by vortices generated aft of the main body 152. Enabling the rotation of the oscillator around the X axis may also allow for efficient energy harvesting from fluid flow in varying directions. Additionally, enabling the rotation of the oscillator around the X axis enables the oscillator to be brought to its service configuration, as shown in FIG. 11b.

In some embodiments, the compressors may be replaced with other means for energy conversion, such as a linear electrical generator, or a mechanical assembly for conversion of linear motion to rotation (e.g., rack and pinion, flywheel), or a piezoelectric transducer.

FIG. 13b schematically depicts an energy convertor in which the return force is at least partially provided by a weight 399 joined to the bottom section of the stalk 154. When the main body 152 is moved rightward form its vertical position, the stalk 154 rotates about the pivot 303 clockwise, causing the weight 399 to be lifted rightwards. The (downward) gravitational force exerted on the weight 399 provides the return force, and as such the gravitational force exerts a force which rotates the stalk 154 counter-clockwise and causes the main body 152 to move leftward toward its vertical position. Similarly, when the main body is moved leftward from its vertical position, the weight 399 will act to rotate the stalk 156 clockwise and cause the main body 152 to move rightward toward its vertical position.

In FIG. 13b, only one compressor 311a is shown for extracting energy from the oscillator's movement. However, any number of compressors or other means described above can be used.

Figure 14:
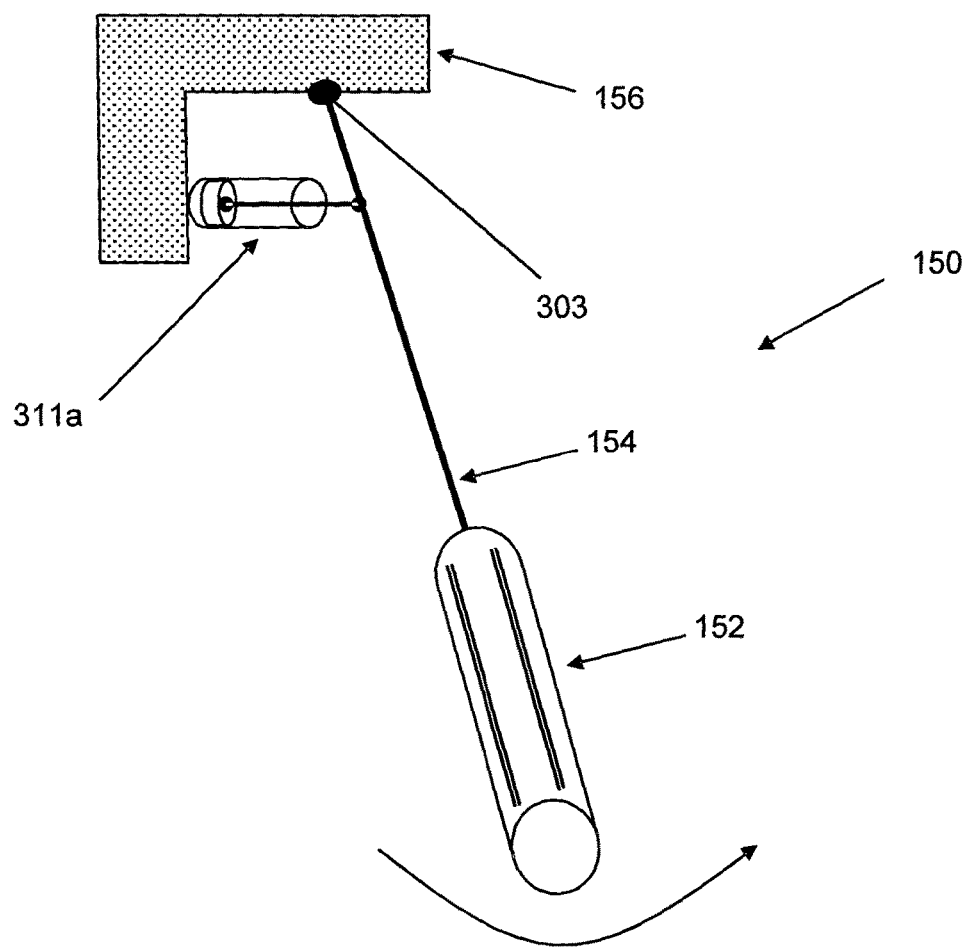
FIG. 14 illustrates an example of the present invention, in which the oscillator is pendulum.

Referring now to FIG. 14, an example of the present invention, in which the oscillator is a pendulum, is illustrated. In the example of the device 150 depicted in FIG. 14, the oscillator is a pendulum, in which the main body 152hangs below the base 156 via a stalk 154 which is rotatable about the pivot 303. The returning force to the pendulum's motion is supplied by the weight of the oscillator itself (i.e. by the combined weight of the main body 152, the stalk 154, and any elements that may be joined to the main body and/or stalk). The energy conversion unit is schematically depicted by the compressor 311a joined to the stalk 154. The energy conversion unit may include any other elements, as described above.

The device 150 may be used for harnessing air current. Optionally, the main body 152 is partially or fully submerged in moving liquid, for example water moving in a river. In this case, the weight of pendulum is preferably made greater than the buoyant force exerted thereon by the liquid.

Figure 15:
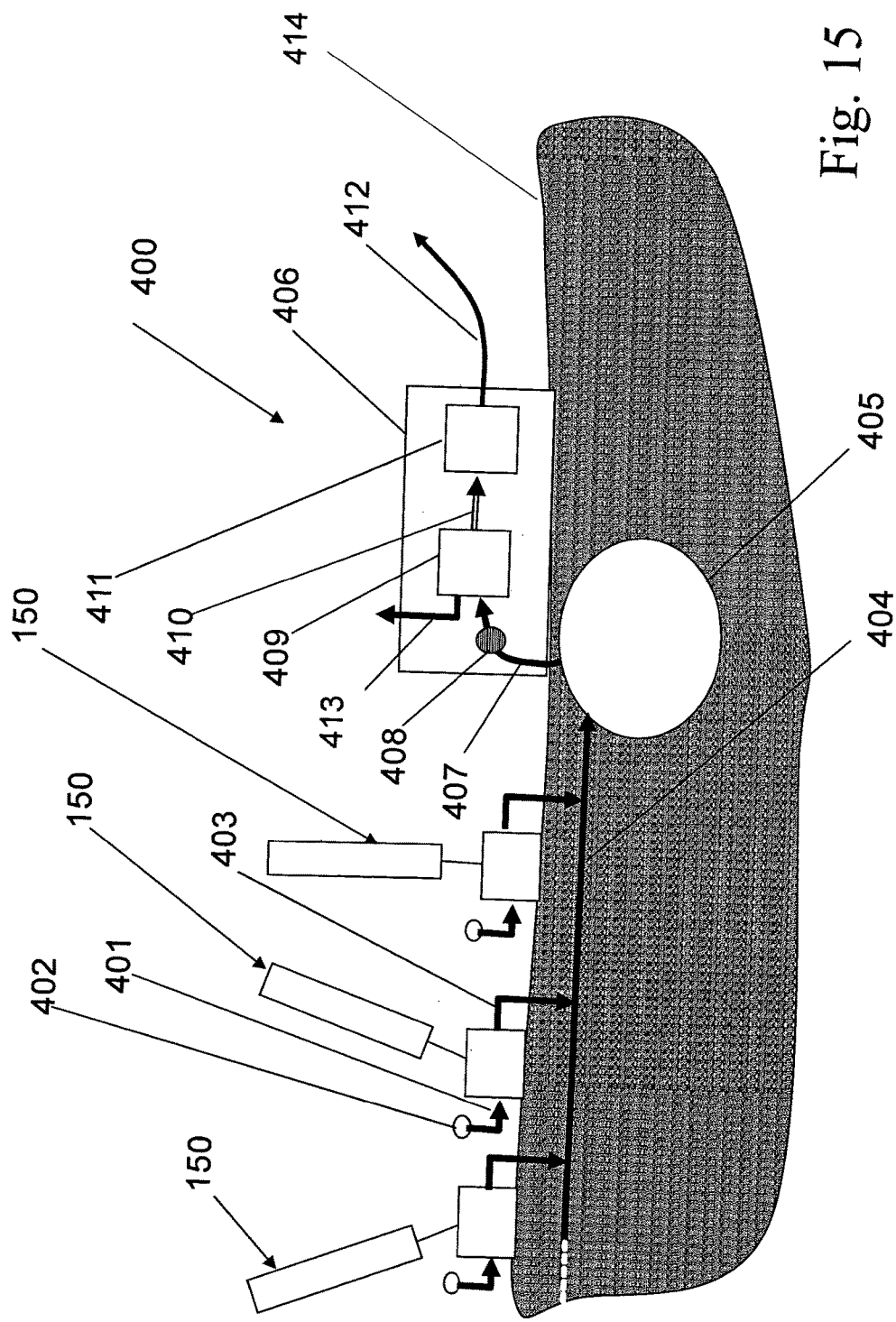
FIG. 15 depicts a land-based system for wind energy harvesting according to some embodiments of the present invention.

Referring now to FIG. 15, a land-based system 400 for wind energy harvesting is depicted according to some embodiments of the present invention. The System 400 is situated on land surface 414, preferably where wind is prevalent. The system 400 includes at least one and preferably a plurality of devices 150 configured as described above. Each of the devices 150 may include a spring-based oscillator (as depicted in FIG. 10), an inverted pendulum (as depicted in FIGS. 11a-11b, 12, 13a-13b), or a right-side-up pendulum (as depicted in FIG. 14).

The devices 150 include at least one compressor (see, for example, compressor 311a in FIG. 13a) drawing atmospheric air (to be used as working fluid) from an air intake 401, preferably through an optional air filter 402. The atmospheric air is compressed by the energy conversion units of the device(s) 150, and compressed air exits the device(s) 150 via compressed air output 403. All compressed air outputs 403 are joined to a compressed air accumulation pipe 404, preferably using one way valves (not depicted). The accumulation pipe 404 leads the compressed air to a location where the compressed air can be used to generate energy, or where the compressed air can be stored for later use. Compressed air is optionally stored in a compressed air reservoir 405. Optionally, compressed air reservoir 405 is located below the surface 414 such as in a natural or man-made cavern 405.

On demand, a generator 406 draws compressed air from compressed air reservoir 405 via compressed air intake 407 by opening the demand valve 408. Compressed air powers a compressed air motor 409, and is vented through a vent 413. Rotational motion of the compressed air motor 409 rotates a shaft 410 which cases a generator 411 to generate electrical power in a cable 412 leading to the useful energy load.

Figure 16:
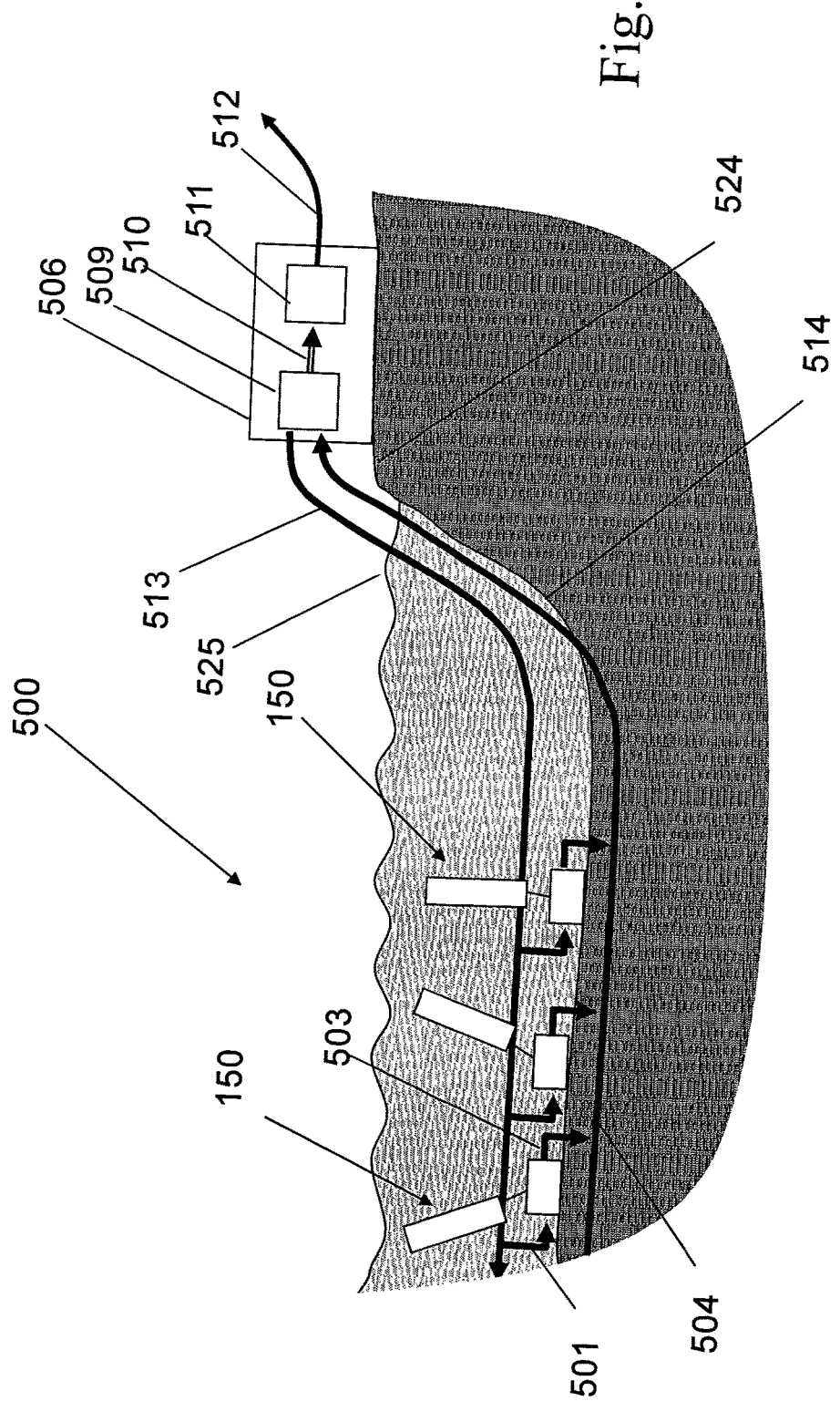
FIG. 16 depicts an underwater system for water flow energy harvesting according to some embodiments of the present invention.

Referring now to FIG. 16, an underwater system for water flow energy harvesting is depicted according to some embodiments of the present invention. The system 500 is situated on river or sea floor 514, preferably where water current is prevalent. The system 500 comprises at least one and preferably a plurality of devices 150, configured as described above, situated below water surface 525. In the depicted embodiment, the devices 150 are adopted to aquatic and possibly corrosive environment.

In the depicted embodiment, pumps or compressors in the devices 150 receive hydraulic fluid from hydraulic intakes 501 connected to a hydraulic return pipe 513. Pressurized hydraulic fluid exits the device 150 though hydraulic outputs 503 connected to a hydraulic accumulation pipe 504. A generator 506, preferably located above the water surface 525 (for example on sea shore 524 or on above sea structure, such as a rig or barge) houses a hydraulic motor 509 powered by a compressed hydraulic fluid in the hydraulic accumulation pipe 504 and returning a decompressed hydraulic fluid to the hydraulic return pipe 513. Rotational motion of motor 509 rotates shaft 510 which cases generator 511 to generate electrical power in cable 512 leading to the useful energy load.

Figure 17:
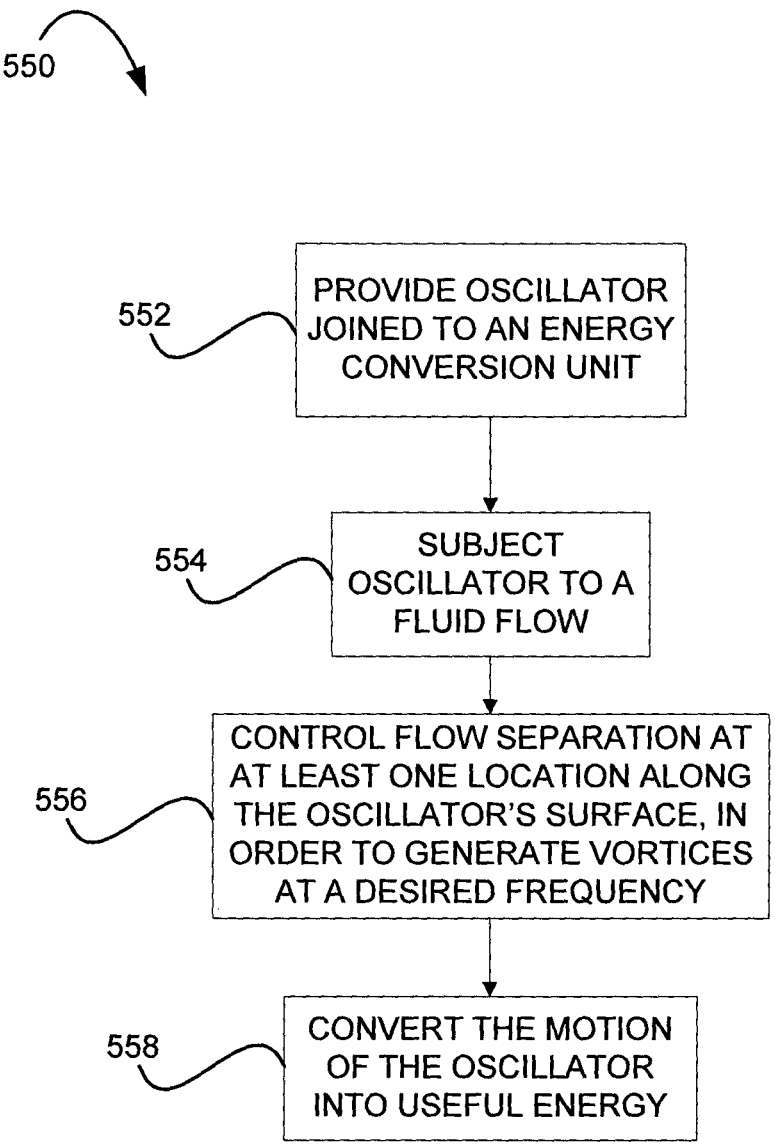
FIG. 17 is a flowchart illustrating a method for extracting energy from an incoming fluid flow, according to some embodiments of the present invention.

Reference is now made to FIG. 17, showing a flowchart 550 of an example of a method for use in extracting energy from an incoming fluid flow, according to some embodiments of the present invention. At 552, an oscillator configured for being joined to an energy conversion unit is provided. The oscillator may be any oscillator as described above, e.g. a spring-based oscillator (FIG. 10), a pendulum (FIG. 14), or an inverted pendulum (FIGS. 11a-11b, 12, 13a-13b). The oscillator includes a main body and a joining element, for anchoring the main body to a base while enabling oscillations of the main body. The oscillator is configured for being joined to an energy conversion unit to enable conversion of the motion from the oscillator's oscillations into useful energy. The main body is associated with an operative flow affecting unit configured for affecting flow over one or more locations of the main body's surface. The operative flow affecting unit may include one or more elements manipulated by one or more actuators. The operative flow affecting unit may be configured, for example, as described above with reference to FIGS. 5a-5b, 6a-6b, 7a-7b, 8, 9.

At 554, the oscillator is subjected to an incoming fluid flow. The fluid flow may be a gaseous flow (e.g. wind) or a liquid flow (e.g. underwater current).

At 556, the flow of fluid over the main body's surface is controlled in order to control the flow separation effect at one or more locations on the main body's surface. The control is performed by activating and deactivating the flow affecting unit according to a predetermined pattern (time pattern or time and position pattern in case the flow affecting unit has more than one flow interacting element), in order to generate vortices aft of the main body at a desired vortex formation frequency, selected in order to increase an amplitude of the oscillator's oscillations. Optionally, the vortex formation frequency is selected to approach the natural frequency of the oscillator. Control of flow separation may be effected by encouraging the flow separation over the main body at one or more locations of the main body's surface, or by encouraging the flow attachment over the main body at one or more locations of the main body's surface, or by simultaneously encouraging flow separation at one or more specific locations and flow attachment at one more different locations.

The pattern according to which the flow affecting unit is activated and deactivated may be a predetermined one, or may be determined during the oscillation according to certain parameters sensed in real time. Such parameters may include an acceleration of the main body, and/or properties of the fluid flow (e.g., incoming flow velocity and/or flow velocity at one or more locations along the main body's surface), and/or a property of the fluid (e.g. density, temperature, etc.).

Optionally, at 558, the oscillator motion is converted into a useful form of energy. The conversion into energy may be performed, for example via one or more compressors (see FIGS. 13a-13b), by a linear electrical generator, by conversion of linear motion to rotation (e.g. rack and pinion, flywheel) or using piezoelectric transducers.

Referring now to FIG. 18, there is provided a graph illustrating experimental results demonstrating the effect of active flow control on a tethered sphere. Experimental data (Jauvtis, N., Govardhan, R., and Williamson, C. H. K., "Multiple Modes of Vortex-Induced Vibration of A Sphere," Journal of Fluids and Structures, Vol. 15, pp. 555-563, 2001) showing the transverse oscillation amplitude (Amp) of a tethered sphere as a function of reduced velocity are depicted by line 601. Superimposed on the data are similar data acquired by the inventor for "no control" 602 data point, and active control 603 using an acoustic speaker, where the burst frequency corresponds to the natural frequency of the sphere.

The experiment was based partially on a classical VIV experiment (as described in Williamson, C. H. K. and Govardhan, R., "Dynamics and Forcing of a Tethered Sphere in a Fluid Flow," Journal of Fluids And Structures, Vol. 11, pp. 293-305, 1997; and in Jauvtis et al, 2001, mentioned above) carried out on a tethered sphere in a flowing stream. In these experiments, the sphere of diameter D was tethered to the upper wall of a wind tunnel (free-stream velocity U), and the motion of the sphere, both streamwise (x) and transverse (y) motions, as viewed from below, was monitored by means of a video camera. Data acquired in the experiments showed that for particular ranges of flow speeds, where the oscillation frequency (f) was of the order of the static-body vortex shedding frequency ($f_{vo}$), there exist two modes of periodic large-amplitude oscillation, defined as modes I and II, separated by a transition regime exhibiting non-periodic vibration.

The experiment described above was duplicated by the inventor, with one important difference: an acoustic speaker was mounted flush with one wall of the wind tunnel at the same streamwise location as the sphere. The speaker was used to control the boundary layer on the sphere by intermittently exciting pre-existing instabilities. The control of boundary layer separation by means of period perturbations is often referred to as Active Flow Control (AFC, see Greenblatt, D. and Wygnanski, I., "The control of separation by periodic excitation," Progress in Aerospace Sciences, Volume 36, Issue 7, pp. 487-545, 2000.). At frequencies much higher than $f_N$ the boundary layer is forced to attach to the surface resulting in relatively large asymmetric loads on the sphere. When the control is applied in an intermittent manner, the boundary layer is forced to separate and attach to the surface in a dynamic fashion. The oscillatory loads associated with dynamic separation, often called dynamic stall, are enormous. For example, the damaging oscillatory loads on rotor blades, caused by dynamic stall, are a major factor limiting the maximum flight speeds of rotorcraft. Here, however, because the objective is energy generation, these large forces have been exploited in the following manner: Firstly, control frequencies were chosen that are known a priori to force partial attachment of the boundary layer to a stationary sphere (see Greenblatt & Wygnanski, 2000, mentioned above). Secondly, this signal was pulsed at a lower frequency, specifically selected to dynamically force the attachment and separation of the boundary layer in an oscillatory manner (Greenblatt, D., Neuburger, D., Wygnanski, I., "Dynamic Stall Control by Intermittent Periodic Excitation," AIAA Journal of Aircraft, Vol. 38, No. 1, 2001, pp. 188-190). Pulsing produces a controlled so-called dynamic stall vortex that the inventor has used it in the past to produce dramatic effects in the wakes of separated flows (e.g. Greenblatt et al, 2001, mentioned above; Greenblatt, D., Melton, L., Yao, C., Harris, J., "Control of a Wing Tip Vortex", AIAA Paper 2005-4851, 23rd AIAA Applied Aerodynamics Conference, Westin Harbour Castle, Toronto, Ontario, 6-9 Jun. 2005; Greenblatt, D., "Management of Vortices Tailing Flapped Wings via Separation Control," AIAA Paper 2005-0061, 43rd AIAA Aerospace Sciences Meeting and Exhibit, Reno, January 2005).

The primary effect of the dynamic stall vortices was to substantially increase the amplitude of the oscillations. A pulse frequency corresponding to the pendulum natural frequency was selected and this produced a dramatic increase in the transverse oscillation amplitude. In fact, by pulsing the speaker at 50% duty cycle, the sphere oscillated at such large amplitudes so as to cause it to collide with the tunnel walls and ceiling, hence producing peak-to-peak amplitudes at least 10 times the sphere diameter. This remarkable increase in amplitude could not be properly monitored because its motion was outside of the camera field of view. Nevertheless, this represents an increase in amplitude by a factor of at least 5 over the conventional vortex shedding observations (e.g. Jauvtis et al, 2001) and produced a factor of 20 more energy. Indeed, this experiment, which utilized actively controlled vortex shedding (ACVS), demonstrated the potential for dramatic increases in energy from the same basic geometric structure. The main reason for the vast differences in amplitude and energy is that natural vortex shedding represents relatively weak forcing. This being a surprising effect due to the well-known destructive nature of lock-on, when compared to the transient hydrodynamic or aerodynamic forces generated by oscillatory control of a separated boundary layer, shows that natural vortex shedding forces are relatively weak.

Thus, the present invention provides for novel and effective technique for extracting energy from an incoming fluid flow while interacting with an oscillator exposed to the fluid flow. The present invention utilizes an operative flow affecting unit on the surface of a main body of the oscillator, where the flow affecting unit is controllably operated for affecting separation (e.g. promoting time-dependent pattern) of streams of the fluid flowing over the surface of the main body.

Those skilled in the art will readily appreciate that various modifications and changes can be applied to the embodiments of the invention as hereinbefore exemplified without departing from its scope defined in and by the appended claims.

The invention claimed is:

1. A device for use in extracting energy from an incoming fluid flow, the device comprising:
    an oscillator assembly mounted on a base, the oscillator assembly comprising: a main body for exposing to an incoming fluid flow; and a joining element attached to the main body and configured for anchoring the main body to the base and enabling oscillation of the main body with respect to the base;
    an operative flow affecting unit comprising at least two slots arranged over opposite sides of the main body with respect to the direction of the incoming fluid flow, the operative flow affecting unit being configured and controllably operable for affecting a separation of streams of the fluid flowing over the surface of the main body and at least one pump assembly operatively associated with the at least two slots such that suction and/or blowing are performed in a periodic fashion at a certain activation frequency; wherein said pump assembly is configured for alternately pumping fluid into or out the at least two slots; and
    a control unit in communication with the operative flow affecting unit, the control unit being configured and operable for activating and deactivating each of the at least two slots of the operative flow affecting unit according to the certain activation frequency, the activation frequency being selected such that interaction between each slot and the fluid streams creates vortices in the fluid streams at a selected vortex formation frequency causing an increase in oscillation of the main body, wherein said selected vortex formation frequency is obtained by controlling said certain activation frequency thereby enabling conversion of motion from the oscillation into useful energy.

2. The device of claim 1, wherein the operative flow affecting unit is configured such that the at least two slots are operable for increasing separation between the main body's surface and the streams of fluid flowing over the main body's surface.

3. The device of claim 1, wherein the operative flow affecting unit is configured such that the at least two slots are operable for increasing attachment between the main body's surface and the streams of fluid flowing over the main body's surface.

4. The device of claim 1, wherein the joining element is a spring.

5. The device of claim 1, wherein the joining element is a stalk joined to a pivot in the base, the stalk being rotatable at least in one plane with respect to the base, such that the oscillator assembly is a pendulum capable of oscillating about said pivot.

6. The device of claim 1, wherein the control unit is configured and operable to provide the vortex formation frequency approaching a natural frequency of the oscillator.

7. The device of claim 1, wherein the certain activation frequency according to which each slot of the operative flow affecting unit is activated and deactivated is predetermined.

8. The device of claim 1, wherein the certain activation frequency according to which each slot of the operative flow affecting unit is activated and deactivated is determined during the device operation.

9. The device of claim 1, wherein the control unit comprises: at least one sensor for sensing one or more parameters and generating measured data indicative thereof, the one or more parameters comprising at least one of the following: at least one parameter relating to said motion of the main body, at least one parameter relating to the fluid flow, at least one property of the fluid; and a processing utility configured and operable for receiving and processing the measured data from the at least one sensor and determining the activation frequency according to which the at least two slots of the operative flow affecting unit is activated and deactivated.

10. The device of claim 9, wherein the parameter relating to said motion includes at least one of an acceleration and a velocity of said main body.

11. The device of claim 9, wherein the parameter relating to the fluid flow includes at least a fluid flow velocity.

12. The device of claim 9, wherein the fluid property parameter includes at least one of fluid density and temperature.

13. The device of claim 1, wherein the oscillator assembly comprises at least one of the following: a spring-based oscillator, a pendulum, an inverted pendulum.

14. A system for extracting energy for a fluid flow, comprising:
    at least one oscillating device configured as the device of claim 1;
    at least one compressor, each compressor being powered by the oscillating device and being configured for compressing a working fluid;
    an accumulation pipe for receiving the compressed working fluid from the at least one compressor and leading the compressed working fluid to a predetermined location, thereby enabling direct use or storage of the compressed working fluid for further use.

15. The system of claim 14, further comprising a motor configured for drawing the compressed working fluid located in said predetermined location and using the compressed working fluid to generate useful energy, and venting the working fluid after use.

16. The system of claim 14, wherein the working fluid is air, and the compressor comprises an air intake for drawing the air.

17. The system of claim 15, further comprising a hydraulic return pipe for returning the used working fluid to the at least one compressor.

18. The device of claim 1, wherein said control unit is operative to control said operative flow affecting unit to simultaneously produce suction from one of said slots and blowing out of the other one of said slots.

19. The device of claim 18, wherein said at least one pump assembly comprises one of a piston, a bellows, and a diaphragm.

20. A method for use in extracting energy from an incoming fluid flow, the method comprising:
- providing an oscillator assembly mounted on a base, the oscillator assembly comprising: a main body for exposing to an incoming fluid flow; and a joining element attached to the main body and configured for anchoring the main body to the base and enabling oscillation of the main body with respect to said base;
- subjecting the oscillator to a fluid flow;
- controlling a separation of the fluid flowing along a surface of the main body by activating and deactivating at least two flow interactive elements located on the surface of the main body according to a certain activation frequency, wherein said controlling comprises pumping said fluid flowing along a surface of the main body alternately into or out of said at least two flow interactive elements, such that suction and/or blowing are performed in a periodic fashion at said certain activation frequency being selected such that interaction between each flow interactive element and fluid streams creates vortices in the fluid streams at a selected vortex formation frequency causing an increase in oscillation of the main body, wherein said selected vortex formation frequency is obtained by controlling said certain activation frequency thereby enabling conversion of motion from the oscillation into useful energy.

21. The method of claim 20, further comprising converting the motion of the oscillation into useful energy.

22. The method of claim 20, wherein controlling a separation of the fluid flowing along a surface of the main body comprises at least one of the following: (i) increasing the separation between the main body's surface and the streams of fluid flowing over the main body's surface; (ii) increasing attachment between the main body's surface and the streams of fluid flowing over the main body's surface; (iii) providing the vortex formation frequency approaching a natural frequency of the oscillator.

23. The method of claim 20, wherein the certain activation frequency according to which each flow interactive element is activated and deactivated is predetermined.

24. The method of claim 20, wherein the certain activation frequency according to which each flow interactive element is activated and deactivated is determined during operation.

25. The method of claim 20, wherein the oscillator assembly comprises as at least one of the following: a spring-based oscillator, a pendulum, an inverted pendulum.

26. The method of claim 20, wherein said step of controlling is carried out to simultaneously pump fluid into one of the flow interacting elements and out of another one of the flow interacting elements.

27. The method of claim 26, wherein said step of pumping is carried out with a pump that is one of a piston, a bellows, and a diaphragm.

* * * * *